(12) United States Patent
Uehara et al.

(10) Patent No.: US 7,766,229 B2
(45) Date of Patent: Aug. 3, 2010

(54) BILL/COIN PROCESSING SYSTEM

(75) Inventors: Osamu Uehara, Hiratsuka (JP); Takashi Ishimatsu, Himeji (JP); Kazuyuki Shimizu, Yashio (JP); Kazuhiro Doi, Himeji (JP); Koichi Nishida, Tokyo-To (JP)

(73) Assignee: Glory Ltd., Hyogo-Ken (JP)

( * ) Notice: Subject to any disclaimer, the term of this patent is extended or adjusted under 35 U.S.C. 154(b) by 74 days.

(21) Appl. No.: 11/975,873

(22) Filed: Oct. 22, 2007

(65) Prior Publication Data
US 2009/0101723 A1   Apr. 23, 2009

(51) Int. Cl.
*G06K 15/00* (2006.01)

(52) U.S. Cl. .................... 235/383; 235/7; 235/7 A; 235/379; 705/16; 705/40; 705/41; 705/42; 705/43

(58) Field of Classification Search .............. 235/7, 235/7 A, 379, 383; 705/16, 40–43
See application file for complete search history.

(56) References Cited

U.S. PATENT DOCUMENTS 6,435,329 B1 * 8/2002 Amari et al. ............... 194/206
6,779,722 B1 * 8/2004 Mason ....................... 235/383
2003/0178281 A1 * 9/2003 Goto et al. ................. 194/206

* cited by examiner

*Primary Examiner*—Thien Minh Le
*Assistant Examiner*—Tuyen K Vo
(74) *Attorney, Agent, or Firm*—Renner, Kenner, Greive, Bobak, Taylor & Weber

(57) ABSTRACT

A bill and coin processing system including a bill and coin processing apparatus having: an interface unit capable of exchanging information via a communication unit with the point-of-sales terminal machine; a money receiving unit receiving money by way of a price of a commercial product; a discriminating unit discriminating between at least denominations of the bills and coins received from the money receiving unit; a storing/discharging unit stored with the received bills and coins on the basis of a result of the discrimination made by the discriminating unit and capable of discharging the bills and coins by giving a discharge instruction to the bill and coin processing apparatus from the point-of-sales terminal machine; a money discharging unit discharging the bills and coins outside a machine, which have been discharged from the storing/discharging unit; and a control unit controlling the money discharging unit to discharge the bills and coins from the storing/discharging unit on the basis of a discharge instruction accepted by the interface unit and given to the bill and coin processing apparatus from the point-of-sales terminal machine.

22 Claims, 18 Drawing Sheets

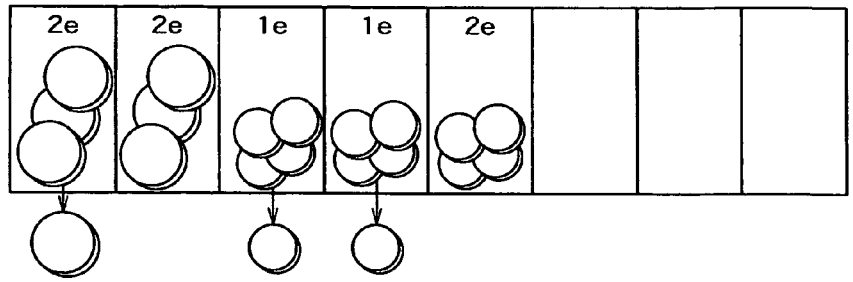
FIG. 9
|  | FIXED AMONT RESIDUAL VALUE COUNT | IN-MACHINE ON-HAND MONEY (RESIDUAL VALUE) COUNT | DEFICIENT (REPLENISHMENT-REQUIRED) MONEY COUNT | COIN-ROLL COUNT | ROUND-DOWN/ ROUND-UP |
|---|---|---|---|---|---|
| 25c: | 120pcs | 41pcs | 79pcs | 1.975rolls | 1roll/2rolls |
| 10c: | 100pcs | 44pcs | 56pcs | 1.120rolls | 1roll/2rolls |
| 5c: | 100pcs | 77pcs | 23pcs | 0.575rolls | 0roll/1roll |
| 1c: | 120pcs | 58pcs | 62pcs | 1.240rolls | 1roll/2rolls |
FIG. 10
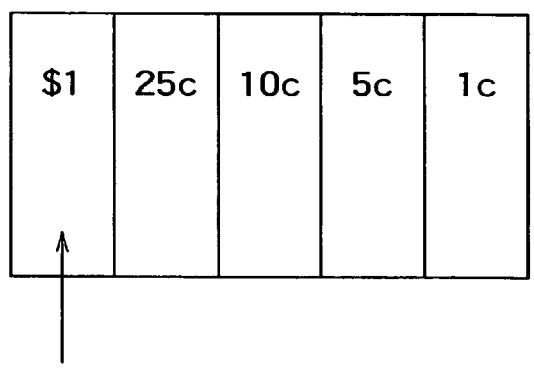
CANADIAN COINS ALSO INPUT
FIG. 11

CASE OF DEPOSIT PORT BEING DISPOSED ON CASHIER SIDE

CASE OF DEPOSIT PORT BEING DISPOSED ON CUSTOMER SIDE

BILL/COIN PROCESSING SYSTEM

BACKGROUND OF THE INVENTION

1. Field of the Invention

The present invention relates to a bill and coin processing system capable of handling deposited coins and bills in recycle.

2. Background of the Invention

Shops etc in the distribution business widely employ a bill and coin processing system configured in combination with a POS (Point of Sales) terminal, which stores a received money and discharge the money as a transaction-based change.

Known as a typical bill and coin processing system in the distribution business is an electronic cash register with a change discharger according to U.S. Pat. No. 4,817,041 (Application Laid-Open No. 170960/1984 of the equivalent basic application) filed by Sakamoto et al. A scheme of this system is that the change can be paid out in response to an instruction given from an upper terminal machine such as a POS register.

In the apparatus dealing with the bills and coins, it is generally practiced to recycle the received bills and coins for changes. A recycle-enabled system does not, however, exist in the bill and coin processing systems capable of paying out the changes in response to the instruction given from the upper terminal machine.

Therefore, the cashes must be collected and replenished each time a person in charge of the cash register is replaced. This causes a problem that a person (casher) in charge of accounts and a responsible person at a backup support operating division (back office) get burden with a larger amount of operations.

On the other hand, methods of how the changes of plural types of bills and coins are discharged and how these plural types of bills and coins are recycled, depend on local circumstances.

For example, the U.S.A. issues seven denominations of bills such as a 1 dollar, 2 dollars, 5 dollars, 10 dollars, 20 dollars, 50 dollars and 100 dollars. Recycle target denominations in many cases are, however, three denominations such as 1 dollar, 5 dollars and 10 dollars, which have a large frequency of the use. The case of setting the three denominations as the recycle target denominations exemplifies, in addition, a combination of 1 dollar, 10 dollars and 20 dollars and a combination of 1 dollar, 5 dollars and 20 dollars.

Furthermore, the coins of all the denominations can be in principle recycled. The discharge of the changes of both of the bills and the coins involves, for example, using one denomination of 1 dollar in the case of the U.S.A. and four denominations such as 1 fen, 1 jiao, 5 jiao and 1 yuan in China. Hence, when discharging the changes, a selection of which type of money, the bill or the coin, is discharged is left to the judgment of the person in charge of the cash register in terms of a relation with the recycle. The person in charge of the cash register gets troublesome enough to make the judgment for each transaction when discharging the changes.

Furthermore, the following are two methods of the operations between the POS register defined as the upper terminal machine and the change discharger.

The first method is a first-out, last-in method (operation), wherein the change discharger mode is set to a change discharger mode. This change discharger mode is a mode in which the person in charge of the cash register visually confirms the money received from a customer, manually inputs the amount of money to the POS register, pays out first the change, and thereafter stores the received money in the change discharger.

The second method is a first-in, last-out method (operation), wherein the change discharger mode is set to a deposit mode.

The deposit mode is that the change discharger at first counts the bills and coins received from the customer, then transmits the amount of bills and coins to the POS register, and thereafter pays out the change.

The first-out, last-in method is often applied in Japan, while the first-in, last-out method is often used in foreign countries. The first-in, last-out method is invariably applied to a self-settlement in which the customer himself or herself makes a settlement.

A difference in terms of dealing with the bills and coins exists between these modes.

To be specific, in the first-out, last-in method, what is deposited into the change discharger both when a transaction is conducted and when replenishment is performed, is the money all at a shop, and hence there is no necessity for discriminating therebetween. Accordingly, the change discharger is always enabled to receive the money, whereby efficiency of the operation can be increased. For example, it is feasible to replenish the changes and to store the money related to the last transaction even during a startup of the POS register and during a scan over a commercial product.

On the other hand, in the first-in, last-out method, the money deposited when performing the transaction is the money of the customer, and, by contrast, the money deposited during the replenishment is the money at the shop, which needs the discrimination therebetween. Moreover, the operation proceeds continuously, and hence it is required to specify whose money is handled between the anterior and posterior customers.

For instance, in the case of trying to deposit the money for the replenishment during the transaction and if accepted when the previous customer tries to deposit the money after paying out the change, it follows that the bills and coins of different possessors exist in mixture. If the bills and coins are handled in this state, an error occurs in a result of calculation, a situation such as necessitating a return process is brought about, and there arises a problem of causing a decrease in the efficiency of the operation.

Moreover, the coin change discharger for a domestic use in Japan has following three types of methods of starting counting the coins.

(1) After inputting the coins, the coin change discharger starts counting the coins upon pressing a deposit start key thereof.

In the case of this method, the operation of the POS register is interrupted by the operation of pressing the key of the coin change discharger of the register, resulting in such a defect that the operation gets troublesome and there are increased occasions of causing a mistake in the operation.

(2) A sensor installed at a deposit port of the coin change discharger starts counting the coins upon detecting the inputted coins.

In the case of this method, the sensor might not detect the inputted coins depending on the way of how the coins are inputted. A problem is that the sensor does not start counting unless the person in charge of the cash register manually operates the sensor or presses the start key.

A problem inherent in these starting methods is excessively time-consuming. Therefore, in the case of the self-settlement in which the customer himself or herself conducts the settlement, a possibility is that some customers are unable to handle by the starting methods (1) and (2).

Such being the case, the following method is considered.

(3) After settling a required amount of money by pressing a subtotal key at the POS register, the counting is automatically started. This method (3) is applied also as a countermeasure for the defect of the method (2). The method (3) is that the deposit operation is started by pressing the subtotal key, and, after waiting for the input for a fixed period of time, detection of a residual quantity is started.

A defect of this method (3) is, however, such that there must be a wait for the input even when there is no input of the coins and a considerable length of time is expended till finishing checking whether the residual coins exist or not, which leads to an elongated transaction. Especially in the case of the foreign countries where a large proportion of settlement means at the cash registers are non-cash settlement means such as credit cards, a rate of the non-input case of the coins rises, and hence such a problem arises that an extra period of processing time is often required.

SUMMARY OF THE INVENTION

The present invention aims at providing a bill and coin processing system enabling strict cash management to be attained by linking up with an upper (POS) terminal.

The present invention Furthermore aims at providing a bill and coin processing system capable of properly discharging a change when there exists an amount of money in coin and in bill at the same par-value.

According to a first aspect of the present invention, in a bill and coin processing system, a bill and coin processing apparatus includes: an interface unit capable of exchanging information via a communication unit with the point-of-sales terminal machine; a money receiving unit receiving money by way of a price of a commercial product; a discriminating unit discriminating between at least denominations of the bills and coins received from the money receiving unit; a storing/discharging unit stored with the received bills and coins on the basis of a result of the discrimination made by the discriminating unit and capable of discharging the bills and coins by giving a discharge instruction to the bill and coin processing apparatus from the point-of-sales terminal machine; a money discharging unit discharging the bills and coins outside a machine, which have been discharged from the storing/discharging unit; and a control unit controlling the money discharging unit to discharge the bills and coins from the storing/discharging unit on the basis of a discharge instruction accepted by the interface unit and given to the bill and coin processing apparatus from the point-of-sales terminal machine.

In the invention according to the first aspect, the bill and coin processing apparatus automatically selects and stores the bills and coins on a denomination-by-denomination basis and operates in linkage with the upper terminal (a cash register etc) via the interface. Hence, the bills and coins are automatically selected and stored under the control of the upper terminal, whereby it is feasible to perform a recycling operation of refluxing the deposited cash as a change and to decrease both a settlement frequency and a money replenishing frequency. Furthermore, an operator at the cash register can be quickly replaced, a cash management level is improved by reducing an excess and a deficiency of the cash, and a highly efficiency found management can be done.

Moreover, according to a second aspect of the present invention, in a bill and coin processing system, a bill and coin processing apparatus includes: an interface unit capable of exchanging information via a communication unit with a point-of-sales terminal machine; a money receiving unit receiving money by way of a price of a commercial product; a discriminating unit discriminating between at least denominations of the bills and coins received from the money receiving unit; a storing/discharging unit stored with the received bills and coins on the basis of a result of the discrimination made by the discriminating unit, capable of discharging the bills and coins by giving a discharge instruction to the bill and coin processing apparatus from the point-of-sales terminal machine, and stored with at least a couple of denominations at the same par-value, which are allocated to the bills and the coins; a money discharging unit discharging the bills and coins outside a machine, which have been discharged from the storing/discharging unit; a control unit controlling the money discharging unit to discharge the bills and coins from the storing/discharging unit on the basis of a discharge instruction accepted by the interface unit and given to the bill and coin processing apparatus from the point-of-sales terminal machine; and a same-par-value discharging unit discharging, when instructed to discharge the bills and coins at the applied par-value by the point-of-sales terminal machine, preferentially any one type of bills and coins, i.e., the coins or the bills at the same par-value on the basis of a previously-done setting.

The invention according to the second aspect, in the bill and coin processing system according to the first mode, Furthermore has a function capable of, in a case where the bills and the coins at the same par-value exist when paying the bills and coin selecting the bills or the coins and therefore enables the setting of how the change is discharged to be done flexibly under a variety of conditions.

Still furthermore, according to a third aspect of the present invention, a bill and coin processing system comprises: a bill and coin processing apparatus; and a point-of-sales terminal machine, the bill and coin processing apparatus including: an interface unit capable of exchanging information via a communication unit with the point-of-sales terminal machine; a money receiving unit receiving money by way of a price of a commercial product; a discriminating unit discriminating between at least denominations of the bills and coins received from the money receiving unit; a storing/discharging unit stored with the received bills and coins on the basis of a result of the discrimination made by the discriminating unit and capable of discharging the bills and coins by giving a discharge instruction to the bill and coin processing apparatus from the point-of-sales terminal machine; a money discharging unit discharging the bills and coins outside a machine, which have been discharged from the storing/discharging unit; and a control unit controlling the money discharging unit to discharge the bills and coins from the storing/discharging unit on the basis of a discharge instruction accepted by the interface unit and given to the bill and coin processing apparatus from the point-of-sales terminal machine, wherein the control unit sets, in the point-of-sales terminal machine, a mode of enabling the bill and coin processing apparatus to receive the bills and coins from a customer and a mode of permitting the bill and coin processing apparatus to receive the bills and coins for replenishment through the bill and coin processing apparatus is disabled to receive the bills and coins from the customer, and discriminates the received bills and coins from the bills and coins of the customer or the bills and coins of a shop.

According to the third aspect, it is possible to clearly discriminate between the money of the customer and the money of the shop, and hence the accuracy and the efficiency of the counting operation can be improved.

Yet Furthermore, according to a fourth aspect of the present invention, a bill and coin processing system comprises: a bill and coin processing apparatus; and a point-of-sales terminal machine, the bill and coin processing apparatus including: an interface unit capable of exchanging information via a communication unit with the point-of-sales terminal machine; a money receiving unit receiving money by way of a price of a commercial product; a discriminating unit discriminating between at least denominations of the bills and coins received from the money receiving unit; a storing/discharging unit constructed of a storing/discharging unit for bills and a storing/discharging unit for coins, stored with the received bills and coins on the basis of a result of the discrimination made by the discriminating unit and capable of discharging the bills and coins by giving a discharge instruction to the bill and coin processing apparatus from the point-of-sales terminal machine; a money discharging unit discharging the bills and coins outside a machine, which have been discharged from the storing/discharging unit; and a control unit controlling the money discharging unit to discharge the bills and coins from the storing/discharging unit on the basis of a discharge instruction accepted by the interface unit and given to the bill and coin processing apparatus from the point-of-sales terminal machine, wherein the control unit accepts an input of selection about whether payment in cash is made or not, and, if the payment in cash is not selected, stops the operation of the storing/discharging unit for the coins.

According to the fourth aspect, when unnecessary in the transaction, the storing/discharging unit for the coins is not operated, and therefore the processing time can be reduced.

BRIEF DESCRIPTION OF THE DRAWINGS

FIG. 9 is a schematic diagram illustrating a modified example of allocating the same denomination to a plurality of storing/discharging units;

FIG. 10 is an explanatory table showing an example of display on an operation/display unit in a case where the number of coins for a roll of wrapped coins can be set for the denomination allocated to the recycle coins in every storing/discharging unit;

FIG. 11 is an explanatory diagram showing a modified example related to the storage of the money in the bill and coin processing system according to the present invention, and showing an example in which the storing/discharging unit for collecting U.S. 1-dollar coins is stored with Canadian coins irrespective of the denominations;

DETAILED DESCRIPTIONS OF THE EXEMPLARY EMBODIMENTS

Exemplary embodiments of a bill and coin processing system according to the present invention will hereinafter be described with reference to the drawings.

(1) Overall Configuration

Figure 1:
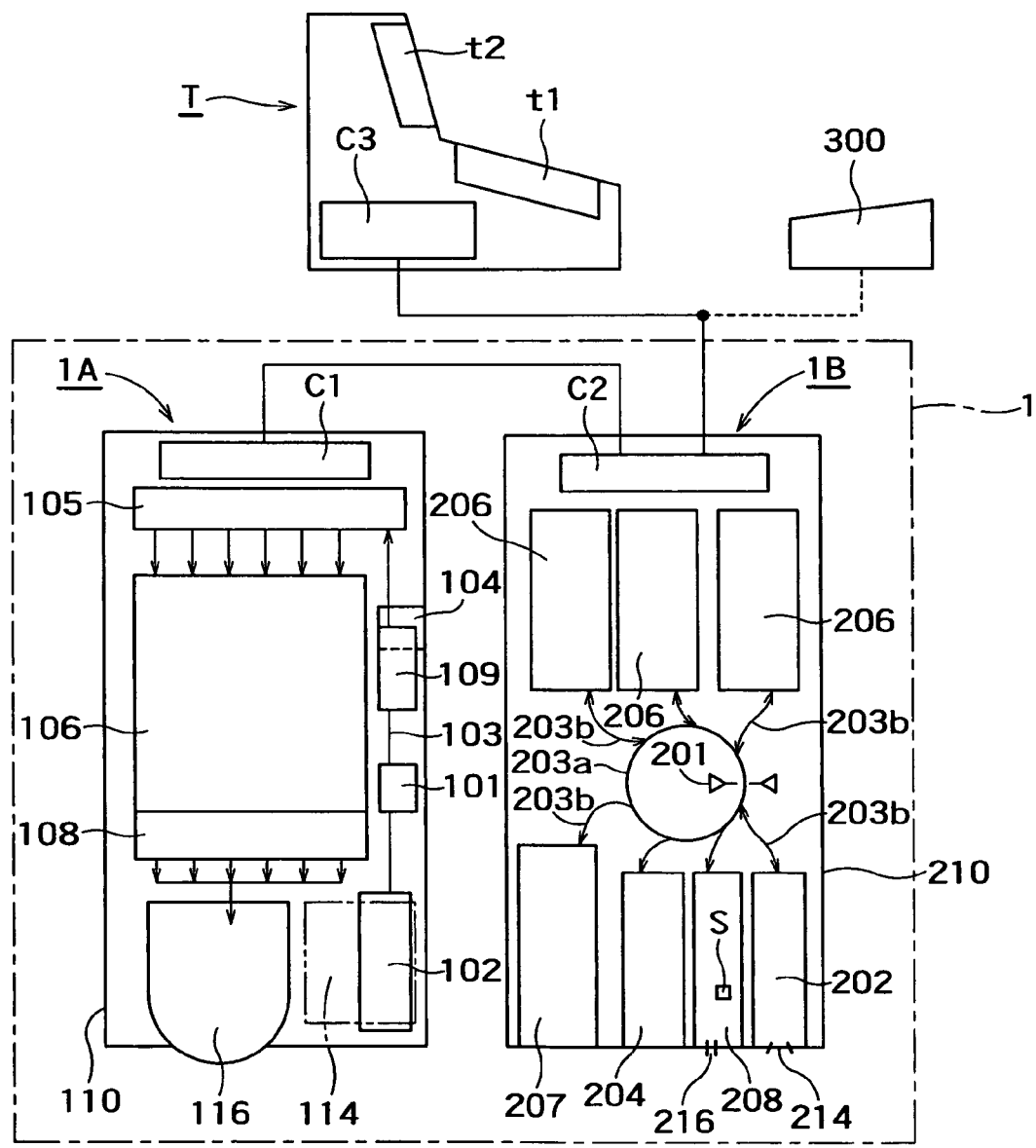
FIG. 1 is a view showing an overall configuration of one embodiment of a bill and coin processing system according to the present invention.

FIG. 1 is a block diagram illustrating an overall configuration of one embodiment of the bill and coin processing system according to the present invention. The bill and coin processing system is exemplified as a system including, roughly, a money repaying apparatus built up by a combination of a coin change discharger (a coin receiving/discharging device) 1A and a bill change discharger (a bill receiving/discharging device) 1B, and by control terminal machine (e.g., a POS register) T for controlling the money repaying apparatus.

The POS register itself is a well-known machine, and hence its in-depth description is omitted. The control terminal machine T according to the present invention is, however, defined as the POS register to which pieces of commercial product information are inputted, and is configured to control the whole of the present system. Therefore, the control terminal machine T includes a key operation unit t1 such s a keyboard, a display unit t2 such as a liquid crystal panel, and a control unit C3. The display unit t2 may have Furthermore a touch panel function as the necessity arises.

The coin change discharger 1A and the bill change discharger 1B respectively include control units (controllers) C1, C2. These control units C1, C2 are connected to each other, and the control unit C3 of the control terminal machine T is connected to the control unit C2. Each of the control units C1 through C3 has an interface unit (unillustrated) enabling the information to be exchanged via a communication means, irrespective of a wireless means or a wired means, with the connected devices.

Furthermore, each of the control units has a memory stored with various categories of data and commands, to which the system refers in the following operations as the necessity arises.

Figure 2:
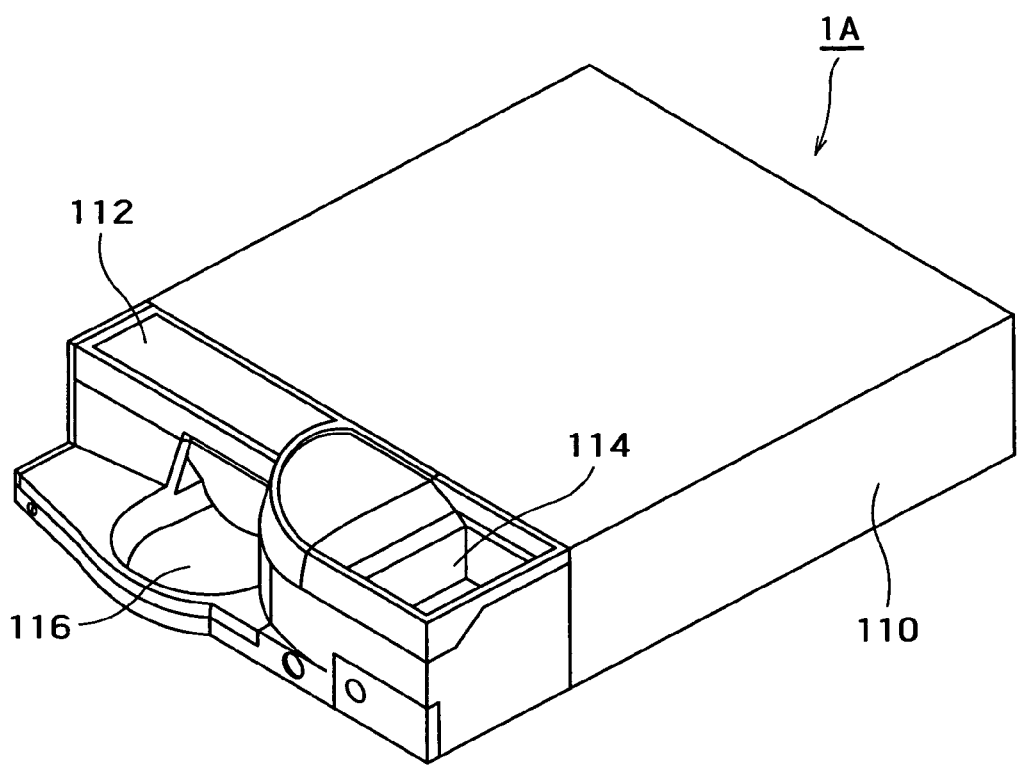
FIG. 2 is a perspective view showing one example of an external appearance of a coin change discharger as a component of one embodiment of the bill and coin processing system according to the present invention.
Figure 3:
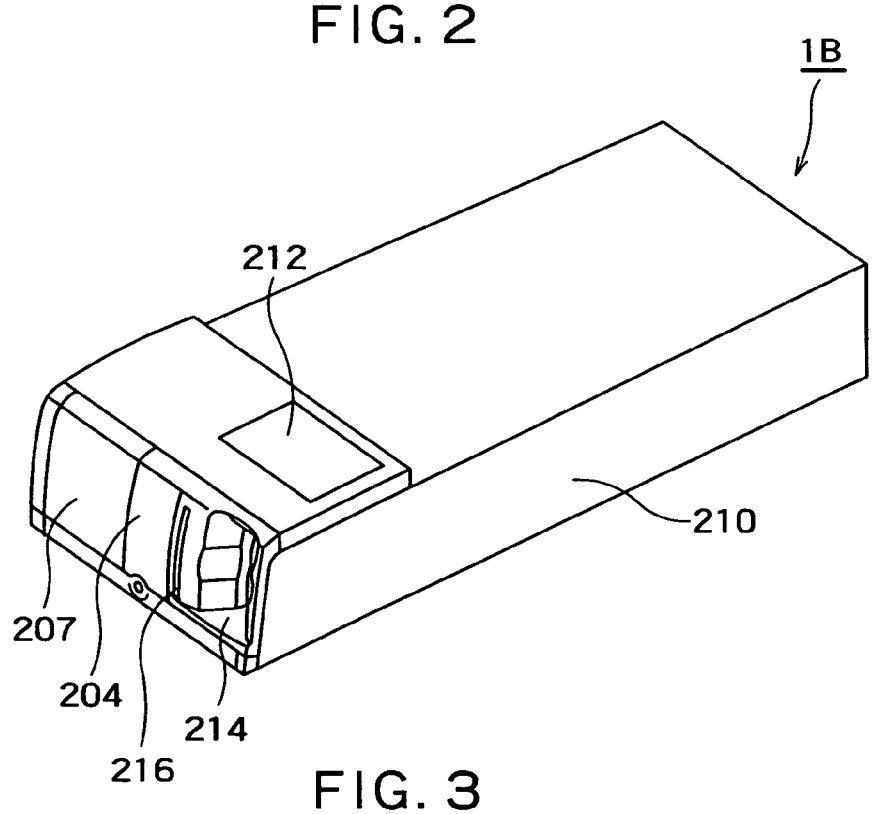
FIG. 3 is a perspective view showing one example of an external appearance of a bill change discharger as a component of one embodiment of the bill and coin processing system according to the present invention.

FIG. 2 is a perspective view showing an external appearance of the coin change discharger 1A. FIG. 3 is a perspective view illustrating an external appearance of the bill change discharger 1B. FIGS. 2 and 3 illustrate the coin change discharger 1A and the bill change discharger 1B by way of each single machine taking a separate enclosure. The coin change discharger 1A and the bill change discharger 1B can, however, take a free layout in a way that arranges these machines in a side-by-side relation or in a vertically stacked manner, depending on a state of their installing place and usability. Furthermore, the coin change discharger 1A and the bill change discharger 1B may be connected via wirings to the control terminal machine T in the way of disposing the dischargers 1A,1B in the vicinity of the machine T and may also connected thereto via the wirings or wirelessly in a way that spaces the dischargers 1A, 1B and the machine T apart.

Furthermore, as circumscribed by an imaginary line, an available scheme may be such that the coin change discharger 1A and the bill change discharger 1B are configured as units, and both of these units are housed in a single enclosure, thus building up the money change discharger 1.

(2) Coin Change Discharger 1A

The coin change discharger 1A includes an enclosure 110 having an operation/display unit 112 (FIG. 2) on an upper face of the front part. The coin change discharger 1A includes, as main components thereof, a coin receiving port 114 for receiving coins from outside, a coin discriminating sensor 101 that discriminates between denominations of the receipt coins received from the coin receiving port 114, a coin storing/discharging unit 106 that stores the receipt coins based on a plurality of denominations thereof corresponding to results of the discriminations made by the coin discriminating sensor 101 and has storing/discharging sections from which the coins can be discharged based on a command, a coin discharging unit 108 that discharges a necessary number of coins according to the denominations of the coins from the coin storing/discharging unit 106, and a coin repaying port 116 used for a user to take out the coins aggregated at one portion by hands, which are discharged by the coin discharging unit 108. The coin receiving, port 114 and the coin repaying port 116 are provided in the front face of the enclosure 110.

To give a more detailed description, the coin change discharger 1A has a coin feed-in mechanism 102 for feeding in the coins in a single-layer/single-line state, which are received from the coin receiving port 114. A coin carrying path 103 for carrying the coins fed in by the coin feed-in mechanism 102 extends in the rear of the coin feed-in mechanism 102. The coin discriminating sensor 101 for discriminating between the denominations of the coins and a coin rejecting unit 109 for rejecting the reject coins, which will be explained later on, are provided on the halfway of the coin carrying path 103. An in-machine storage box 104 for storing the reject coins rejected therefrom is provided downwardly of the coin rejecting unit 109 in a manner attachable to and detachable from the enclosure 110. Moreover, a collection cassette aiming at not recycling but collecting the coins can also be separately provided.

Furthermore, a denomination selecting unit 105, which selects the coins according to the denominations, is provided downstream of the coin carrying path 103. Still Furthermore, the coins are selected in terms of their denominations by the denomination selecting unit 105 and can be stored based on their denominations in the coin storing/discharging unit 106.

The coin storing/discharging unit 106 has storing/discharging portions according to the denominations. The coins stored in the respective storing/discharging portions are selectively fed out and discharged into the coin repaying port 116 by the coin discharging unit 108.

Note that among the denomination-based storing/discharging portions in the coin storing/discharging unit 106, a plurality of storing/discharging portions can be allocated to the denominations of the frequently-paid coins.

(3) Bill Change Discharger 1B

Next, the bill change discharger 1B includes an enclosure 210 having an operation/display unit 212 (FIG. 2) on the upper face of the front part. The bill change discharger 1B includes, as main components thereof, a bill receiving port 214 for receiving bills from outside, a bill discriminating sensor 201 that discriminates between denominations of the receipt bills received from the bill receiving port 214, a bill storing/discharging unit 206 that stores the receipt bills based on a plurality of denominations thereof corresponding to results of the discriminations made by the bill discriminating unit (sensor 201) and has a plurality of storing/discharging sections from which the bills can be discharged based on a command, and a bill repaying port 216 used for the user to take out the bills aggregated at one portion by hands, the bills being discharged via a circulation carrying path 203a, a connection carrying path 203b and a bill discharging mechanism 208, which are generically defined as a bill discharging means for discharging a necessary number of bills from the bill storing/discharging unit 206.

To describe the configuration more specifically, the bill change discharger 1B illustrated in FIG. 1 has the above-mentioned main components housed in the enclosure 210, and includes the circulation carrying path 203a taking an annular shape, which is provided substantially at a central portion within the enclosure 210. Furthermore, the enclosure 210 houses a bill feed-in mechanism 202 for introducing the deposited bills inserted into the bill receiving port 214 and feeding out the bills accepted from the bill receiving unit towards the circulation carrying path 203a, the bill storing/discharging unit 206 that stores the bills according to the denominations of the bills on the basis of the results of the discriminations made by the bill discriminating sensor 201, the bill discharging mechanism 208 for sending out the bills fed in via the circulation carrying path 203a and the connection carrying path 203b from the bill storing/discharging unit 206 toward the bill repaying port 216, a payment reject unit 204 that rejects an abnormal bill when paying the money, and an attachable/detachable bill collecting cassette 207 that stores the collected bills on the occasion of collecting the bills as the necessity arises from within the bill change discharger 1B. These components are disposed in a way that surrounds an outer periphery of the circulation carrying path 203a.

The bill storing/discharging unit 206 serves to store the bills according to the denominations. For example, the Japan-oriented system preferably has three bill storing/discharging units for one thousand-yen bills, five thousand-yen bills and ten thousand-yen notes, or four bill storing/discharging units including a unit for two thousand-yen bills in addition to the above three units. The US-oriented system preferably has four bill storing/discharging units, the three units for, e.g., the denominations having a large amount of circulation such as 1 dollar, 5 dollars, 10 dollars and remaining one unit for mixtures of denominations other than the above among the seven denominations of bills.

The payment reject unit 204 serves to store [payment reject bills], which will be described later on. Furthermore, the bill collecting cassette 207 serves to store the bills collected from the bill storing/discharging unit 206. The collecting cassette 207 is also used for [overflow bills], which will be explained later on.

The bill discharging mechanism 208 aggregates the bills fed inside and feeds an aggregation of plural bundled bills (as it is in the case of the single bill) outside from the bill repaying port 216 in a way that partially protrudes therefrom. With this contrivance, the bill repaying port 216 functions as a repaying port for aggregating at one place the bills discharged by the circulation carrying path 203a, the connection carrying path 203b and the bill discharging mechanism 208, which are generically defined as the bills discharging means, and facilitating the take-out (pull-out) of the bills by hands of the user. Note that the bill discharging mechanism 208 serves also as a deposit reject unit into [deposit reject bills] explained later on are discharged.

The connection carrying paths 203b for the bills are formed in a one-to-one relation between the circulation carrying path 203a and the bill feed-in mechanism 202, the bill storing/discharging unit 206, the bill discharging mechanism 208, the payment rejecting unit 204 and the collecting cassette 207, respectively. The bill discriminating sensor 201 for discriminating between the denominations of the bills passing through the circulation carrying path 203a is provided at part of the circulation carrying path 203a. It is to be noted that a route switching unit (unillustrated) for switching a bill carrying route between the circulation carrying path 203a and the connection carrying path 203b is disposed along the circulation carrying path 203a.

(4) Control System

Figure 4:
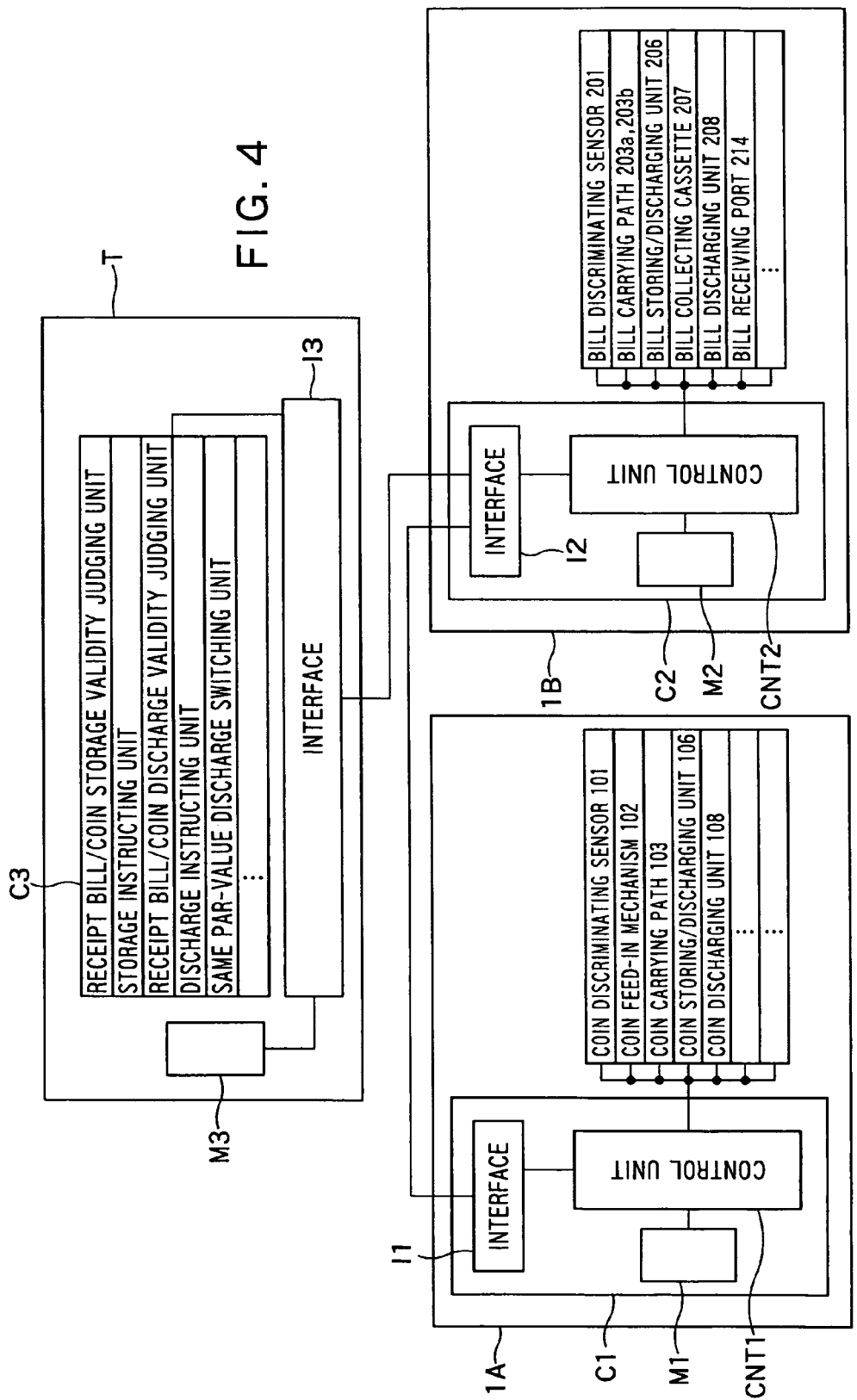
FIG. 4 is a block diagram showing a control system building up one embodiment of the bill and coin processing system according to the present invention.

A control system of the bill and coin processing system according to the present invention will be explained with reference to FIG. 4. The control system is build up by the control unit C1 of the coin change discharger 1A, the control unit C2 of the bill change discharger 1B and the control unit C3 of the control terminal machine T. An assumption is that the coin change discharger 1A and the bill change discharger 1B are controlled by the control unit C3 at the POS defined as the control terminal machine T.

The individual control units C1-C3 have, as described above, the interface units I1-I3 enabling the information to be exchanged via the communication means, irrespective of the wireless means or the wired means. The control units C1-C3 also have the memories M1-M3 stored with various categories of data and commands, to which the system refers during the operation as the necessity may arise.

The control unit C1 of the coin change discharger 1A includes a control part CNT1 that controls the coin discriminating sensor 101, the coin feed-in mechanism 102, the coin carrying path 103, the coin storing/discharging unit 106 and the coin discharging unit 108 on the basis of the command given from the control unit C3.

On the other hand, the control unit C2 of the bill change discharger 1B includes a control part CNT2 that controls the bill receiving port 214, the bill discriminating sensor 201, the circulation carrying path 203a, the connection carrying path 203b, the bill storing/discharging unit 206, the bill collecting cassette 207, the bill discharging mechanism 208 and the bill repaying port 216 on the basis of the command given from the control unit C3 of the control terminal machine T.

Furthermore, the control unit C3 of the control terminal machine T includes a receipt money storage validity judging unit that judges whether the receipt money may be stored or not, a storage instructing unit that issues a storage instruction to the storing/discharging unit on the basis of the judgment made by the receipt money storage validity judging unit, a receipt money discharge validity judging unit that judges whether the stored receipt money may be discharged or not, and a discharge instructing unit that issues a discharge instruction to the storing/discharging unit on the basis of the judgment made by this receipt money discharge validity judging unit.

Moreover, it is feasible through the key operation unit t1 of the control terminal machine T to perform a variety of settings about which storing/discharging unit is allocated to a certain denomination and which denomination a certain storing/discharging unit is allocated to, how the coins and the bills showing the same par value are dealt with, whether the recycle is carried out or not, and whether the non-recycle denomination of money is collected or not, and so on.

(5) Operations

Next, operations of the bill and coin processing system according to the present invention, which has the configuration described above, will be described.

The discussion starts with an explanation of general specification before describing the variety of functions.

(a) Deposit

The coin discriminating sensor 101 and the bill discriminating sensor 201 discriminate between the coins received from the coin receiving port 114 and the bills received from the bill receiving port 214. The receivable money is stored in the coin storing/discharging unit 106 and in the bill storing/discharging unit 206, respectively. Count data of the deposited money is transmitted to the control terminal machine T and stored in corresponding data areas of the memories M2-M3.

The count data of the deposited money can be also displayed on the operation/display unit 112 of the coin change discharger 1A and on the operation/display unit 212 of the bill change discharger 1B.

(b) Payment

Based on a change payment command given from the control terminal machine T, the money corresponding to this command is discharged from the coin storing/discharging unit 106 and the bill storing/discharging unit 206 and is paid out to the coin repaying port 116 and the bill repaying port

216. Similarly to the deposit case, in the payment case also, the payment data of the paid-out money is transmitted to the control terminal machine T and is stored in the corresponding data areas of the in-machine memories M2-M3.

Furthermore, the payment data of the paid-out money can be also displayed on the operation/display unit 112 of the coin change discharger 1A and on the operation/display unit 212 of the bill change discharger 1B.

(c) Replenishment

This is an operation of storing the change money given to a customer in the storing/discharging unit 106 of the coin change discharger 1A and in the storing/discharging unit 206 of the bill change discharger 1B.

A start of a replenishing operation is triggered by a replenishing command given from the control terminal machine T or by manipulations on the operation/display unit 112 of the coin change discharger 1A and on the operation/display unit 212 of the bill change discharger 1B.

The replenishing operation is performed in the same way as in the deposit case as follows. The coin discriminating sensor 101 and the bill discriminating sensor 201 discriminate between the coins received from the coin receiving port 114 and the bills received from the bill receiving port 214. The receivable money is stored in the coin storing/discharging unit 106 and in the bill storing/discharging unit 206, respectively. The count data of the thus-replenished money is transmitted to the control terminal machine T and is simultaneously stored in the corresponding data areas of the in-machine memories M2-M3.

Furthermore, the count data of the replenished money can be also displayed on the operation/display unit 112 of the coin change discharger 1A and on the operation/display unit 212 of the bill change discharger 1B, respectively.

(d) Collection

This is an operation of collecting outside the machine the money, which has already been stored in the coin storing/discharging unit 106 of the coin change discharger 1A and in the bill storing/discharging unit 206 of the bill change discharger 1B.

The collecting operation enables the selection of a mode (full collection mode) of collecting the money already stored in all the storing/discharging units and a mode (partial collection mode) of collecting the money already stored in specified storing/discharging units.

A start of the collecting operation is triggered by a full collection command and a partial collection command given from the control terminal machine T or by manipulations on the operation/display unit 112 of the coin change discharger 1A and on the operation/display unit 212 of the bill change discharger 1B. The collecting operation involves, in the same way as the payment is done, discharging an applicable amount of money from the coin storing/discharging unit 106 and from the bill storing/discharging unit 206 and paid out to the coin repaying port 116 and to the bill repaying port 216. The collection data of the paid-out money is transmitted to the control terminal machine T and is simultaneously stored in the corresponding data areas of the in-machine memories M2-M3.

Moreover, the collection data of the paid-out money can be also displayed on the operation/display unit 112 of the coin change discharger 1A and on the operation/display unit 212 of the bill change discharger 1B.

Note that if full-of-storage at the coin repaying port 116 or the bill repaying port 216 is detected during the collecting operation, the discharge from the relevant storing/discharging unit is interrupted. Then, when a person in charge of a cash register takes out the money from the coin repaying port 116 or the bill repaying port 216, the discharge from the relevant storing/discharging unit resumes.

Furthermore, the coin repaying port 116 can take a structure with an undersurface being opened. When collecting the money, the undersurface is set in the open state, and a collection box and a collection bag for receiving the discharged coins are installed under the coin repaying port 116, thereby enabling the money to be collected without interrupting the discharge operation.

Moreover, in the bill change discharger 1B, the collected bills can be collected into the bill collecting cassette 207 other than carrying the collected bills to the bill repaying port 216. In this case also, till detecting the full-of-storage at the bill collecting cassette 207, the collection can be performed without interrupting the discharge operation.

Still Furthermore, the collection into the bill collecting cassette 207 facilitates dealing with the post-collecting bills and enables strict cash management.

Multiple embodiments will hereinafter be described based on the above-mentioned general operations as a premise.

First Embodiment

Figure 5:
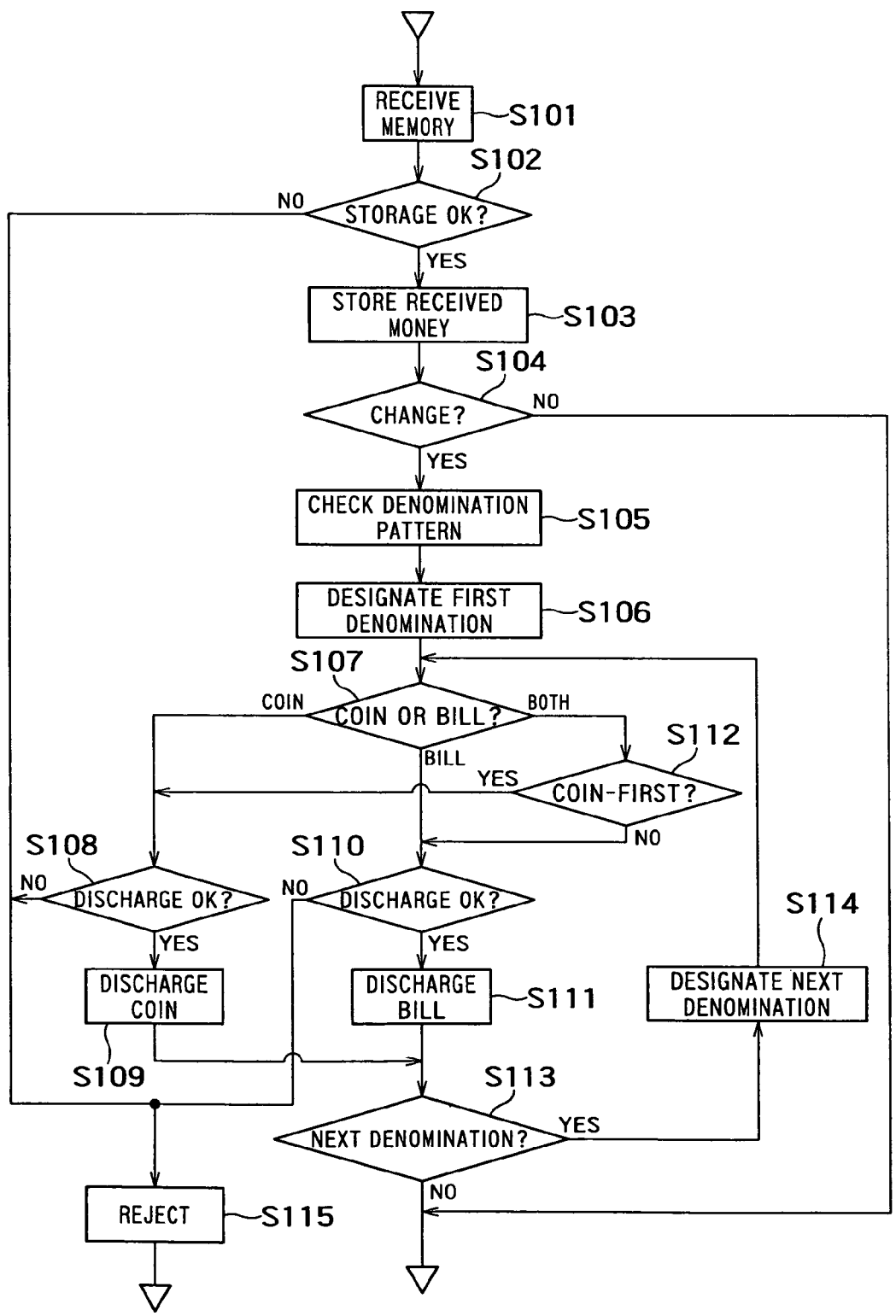
FIG. 5 is an explanatory flowchart showing a change discharging operation in the bill and coin processing system according to the present invention.

FIG. 5 is a flowchart showing a change discharge function in the variety of control functions implemented by the POS terminal. A problem is such a case that the money discharged as the changes might be either the bills or the coins. A scheme of a first embodiment is that a coin-first mode (precedence of coin) or a bill-first mode (precedence of bill) can be set beforehand according to the denominations.

Note that in the case of U.S.A., a preferable coin change discharger is capable of receiving five or more denominations of coins and paying four or more denominations of coins, while a preferable bill change discharger is capable of receiving seven or more denominations of bills and paying two or more denominations of bills.

The description will be made in due sequence. When the money is deposited after a transaction with the user such as the customer has been conducted (step S101), by the control terminal machine T determines the deposited money, from results of the discriminations by the coin discriminating sensor 101 and the bill discriminating sensor 201, about whether the deposited money is storable or not (S102). The money is, if not storable, rejected (step S115) and is, if storable, stored according to the bill/coin classification and the denominations in the storage sections, which are previously set through the control terminal machine T (step S103). Note that the money, when stored, can be stored based on an old-and-new classification, a front-surface-and-undersurface classification and a direction classification if different in terms of their designs at the same par value according to the necessity as well as being based on the bill/coin classification and the denomination classification.

Next, it is checked whether there is a change or not (step S104. If there is the change, the operation comes to a change mode, in which the control unit C3 of the control terminal machine T checks, to begin with, an option about what combination pattern of the denominations is applied to an amount of the change in the case of discharging the change (step S105).

The combination pattern of the denominations is flexible to select a variety of patterns such as previously giving the priority to the high-valued denominations and getting the specified denominations contained.

Next, the first denomination is designated based on this combination pattern of the denominations (step S106), and this pattern of denominations of money are judged with respect to the bill and the coin (step S107). In the case of the coins, a coin discharge instruction is given to the coin change discharger, and it is checked whether or not the discharged coins are authenticated as the normal money and are judged dischargeable by the receipt money discharge validity judging unit (step S108). If dischargeable, the coins are discharged (step S109). Similarly, when the denomination of the change is of the bills, a repayment instruction is given to the bill change discharger, and it is checked whether or not the discharged bills are authenticated as the normal money and are judged dischargeable by the receipt money discharge validity judging unit (step S110). If dischargeable, the bill change discharger is instructed to discharge the bills (step S111).

As described above, there is the case of including both of the coins and the bills with respect to the denomination for the repayment. As for the denomination, e.g., one dollar, the first embodiment involves previously setting which is given the priority for the repayment. Accordingly, the control unit C3 of the control terminal machine T, when the denomination of the change proves to include both of the coins and the bills in step S107, checks if the coin-first mode is set with respect to the denomination (step S112). In the case of the coin-first mode, the coin discharge instruction is given to the coin change discharger 1A (steps S108, S109). In the case of the bill-first mode, the change discharge instruction is given to the bill change discharger 1B (step S110, S111).

Subsequently, it is checked whether or not there is a next denomination of the repayment target money (step S113). If not, the operation is terminated. Whereas if there is, however, the processing proceeds to the next denomination (step S114), in which the processes in steps S107 through S112 continue till the change of all the denominations is discharged.

As for the discharge of the change, the control units C1, C2 of the coin-and-bill change dischargers 1A,1B execute the variety of control processes such as controlling the order of the discharge denominations and a discharge interval. The respective discharge means are controlled based on the repaying instruction given form the control terminal machine T so as to discharge the money stored in the coin storing/discharging unit 106 and in the bill storing/discharging unit 206 sequentially for every specified denomination of money at time-intervals.

The first embodiment, when the denomination of the change includes both of the coins and the bills, involves giving the discharge instruction to the coin change discharger 1A and to the bill change discharger 1B according to the priority setting. This priority setting can be, however, done by use of the key operation unit t1 of the control terminal machine T or an instruction terminal machine 300 separately so provided as to connect with the communication line.

Note that the instruction of discharging the change bills and the change coins is given sequentially according to the processing flow described above, however, the determination thereof is quickly made. Hence, the coin change discharger 1A and the bill change discharger 1B may perform the discharging operations substantially simultaneously, or one discharger may discharge the money, and thereafter the other discharger may discharge the money.

Moreover, only when a period of predictive discharge time gets longer than the reference time on the basis of setting the sequential discharge as a principle, the simultaneous discharge may be applied in combination. These control processes can be also set beforehand by the control terminal machine T or the instruction terminal machine 300.

Note that the receipt money discharge validity judging unit also enables the setting unit to, with a [currency series] being used as one element for the discharge validity judgment, set this [currency series].

Herein, the [currency series] connotes the money coming under the same denomination but different according to the year of the issuance, wherein the specifications are different as the case may be. For example, in the U.S.A., a pattern or a design might be slightly changed according to the year of the issuance, and a sign of the Secretary of the Treasury in charge might also be changed.

Owing to the discrimination between the [currency series], it is feasible to collect the very old money and to pay out only the money that is new of the year of the issuance.

Second Embodiment

In the first embodiment, if possible of paying out both of the coins and the bills of the denomination at the same par value, the coin-first mode or the bill-first mode is previously set. Based on the present state of the change, however, the optimization can also be conducted, and its details are shown in a flowchart of FIG. 6.

Figure 6:
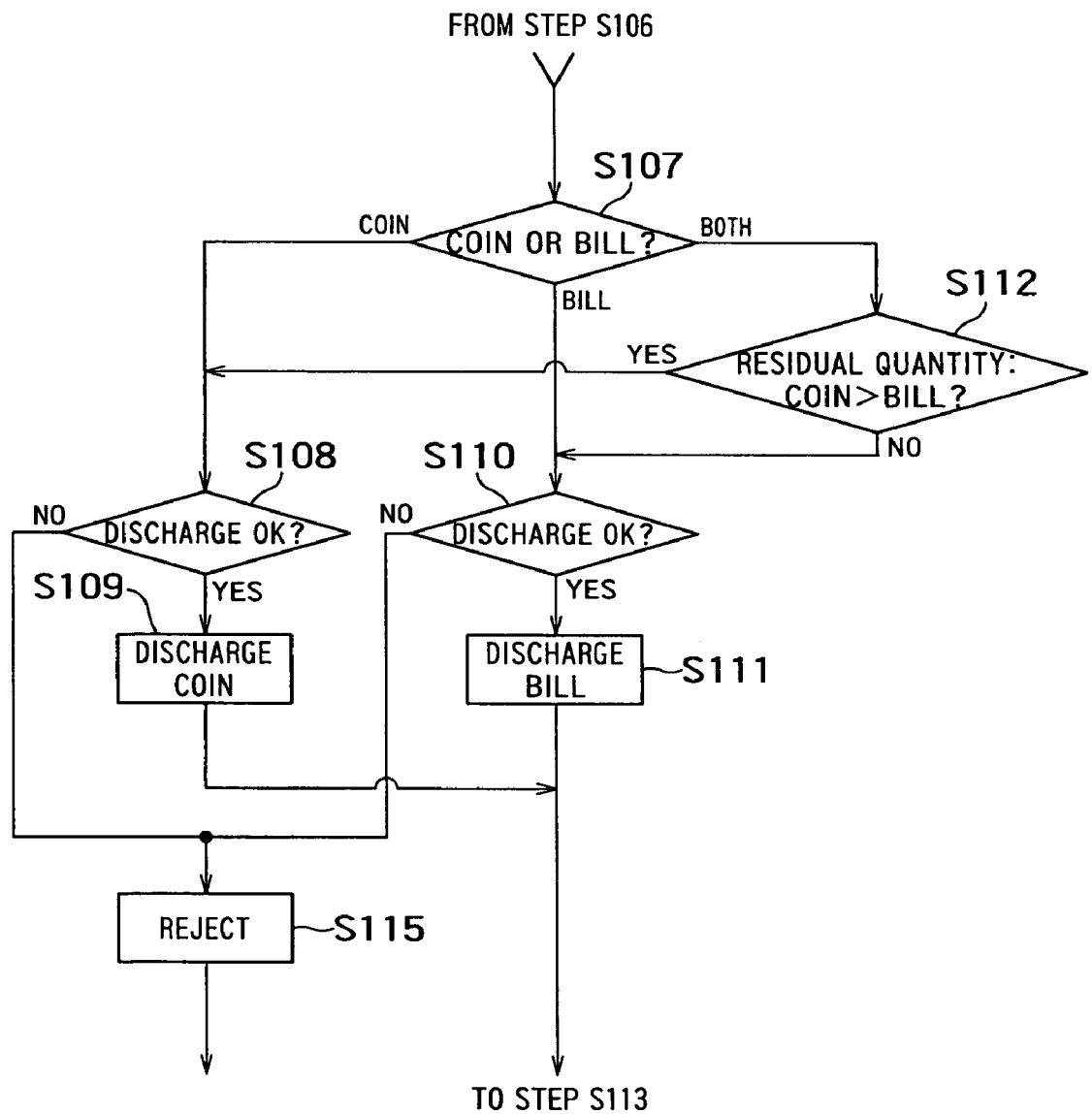
FIG. 6 is a flowchart showing a first modified example of how the discharge money is determined when there exist both of the coins and the bills of the same change target denomination in the change discharging operation in FIG. 5.

FIG. 6 is the flowchart showing a control flow, in which the processes in steps S107 through S112 and a process in place of step S115 are executed, and the processes having the same contents are marked with the same step numbers.

After designating the first denomination, the discrimination between the bill and the coin is made about this denomination (step S107). In the case of the coins, the coin change discharger is instructed to repay the coins (steps S108, S109). In the case of the bills, the bill change discharger is instructed to repay the bills (steps S110, S111). These processes are the same as in the first embodiment, however, if the denomination for the repayment includes both of the coins and the bills, a residual quantity of the coins and a residual quantity of the bills of the applicable denomination are compared based on residual quantity data stored in a residual quantity sensor within the storing/discharging unit or the residual quantity data stored in the memory within the control terminal machine T (step S112). If the quantity of the coins is larger, the coins are discharged (steps S108, S109). Whereas if the quantity of the bills is larger, the bills are discharged (steps S110, S111).

The coins or the bills having the larger residual quantity in the storing/discharging unit are invariably discharged owing to the money discharge in the manner described above, whereby the recycle functions effectively, and the operating efficiency is improved with a less frequency of the replenishment and a less frequency of exchanging the cassette.

Third Embodiment

Figure 7:
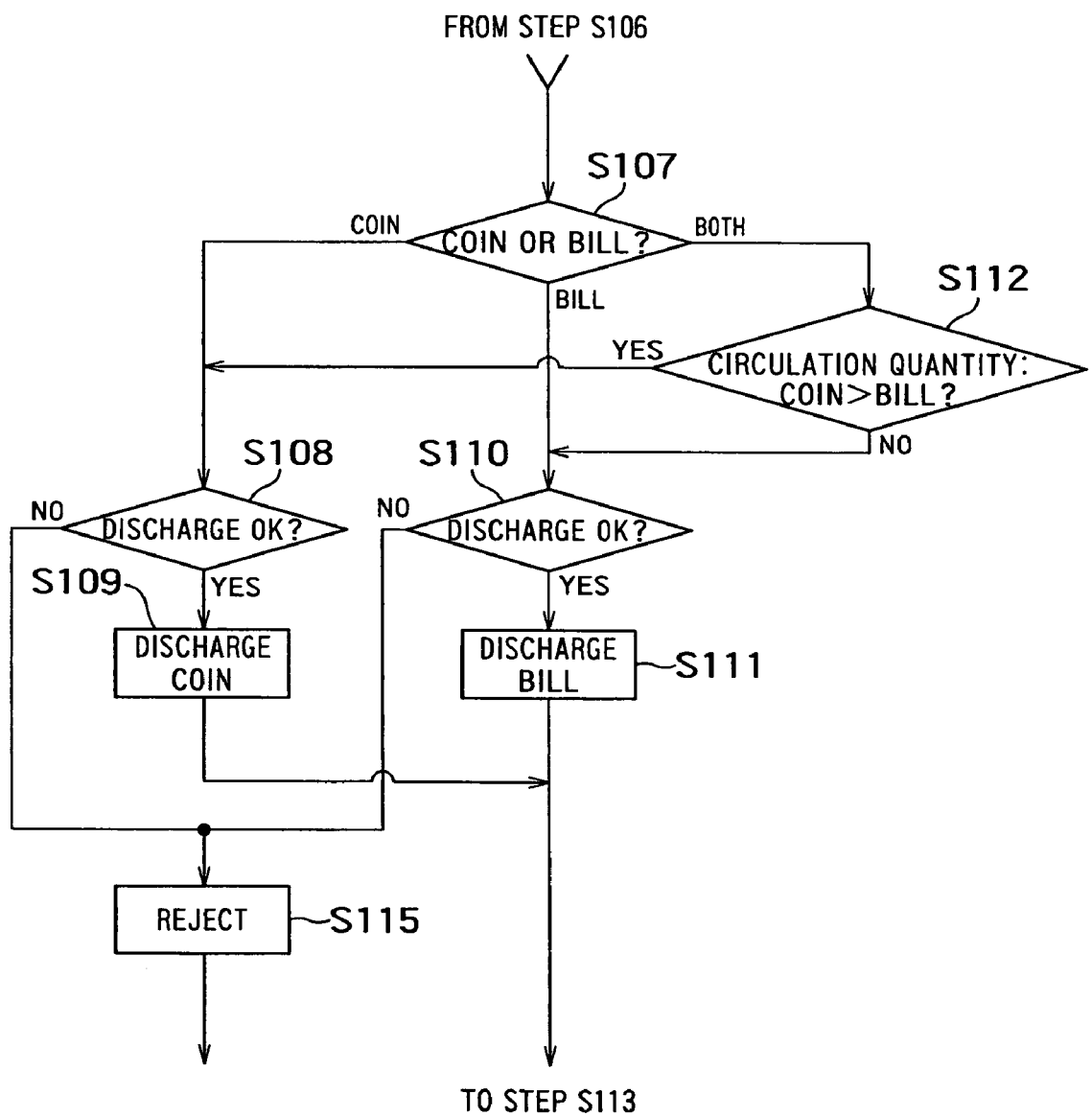
FIG. 7 is a flowchart showing a second modified example of how the discharge money is determined when there exist both of the coins and the bills of the same change target denomination in the change discharging operation in FIG. 5.

The scheme of the second embodiment is, if possible of repaying both of the coins and the bills of the denomination at the same par value, to give the instruction of repaying the money in the coin-first mode or the bill-first mode corresponding to the residual quantity in the storing/discharging unit. A scheme of the third embodiment, however, as shown in FIG. 7, though only step S112 is different from in FIGS. 5 and 6, enables the type (coin or bill) and the denomination of the receipt money to be selected corresponding to a circulation quantity of the money.

For example, in the case of one dollar in the U.S.A., the 1-dollar bills have overwhelmingly a larger quantity of circulation, and hence the payment money is limited to the bills while possible management for the deposit is that both of the coins and the bills are received. Furthermore, another possible management is that the 1-dollar coins are disabled from being received itself.

With this contrivance, the money having the large quantity of circulation can be recycled, and the processing efficiency can be improved by decreasing the replenishment frequency and the cassette exchange frequency.

Fourth Embodiment

In the first embodiment, if possible of repaying both of the coins and the bills of the denomination at the same par value, the setting unit sets beforehand the coin-first mode or the bill-first mode. A scheme of a fourth embodiment is, however, such that the person himself or herself in charge of the cash register enables the discharge mode to be selected from an arbitrary plurality of mode options when starting the transaction regardless of the setting of the same par-value discharge switching unit according to the information set by the setting unit. The options are:

(a) preferential discharge of any one of the coin and the bill;
(b) discharge of any one of the coin and the bill;
(c) discharge of only the coin;
(d) discharge of only the bill; and
(e) preferential discharge of one type of money satisfying a predetermined condition.

Figure 8:
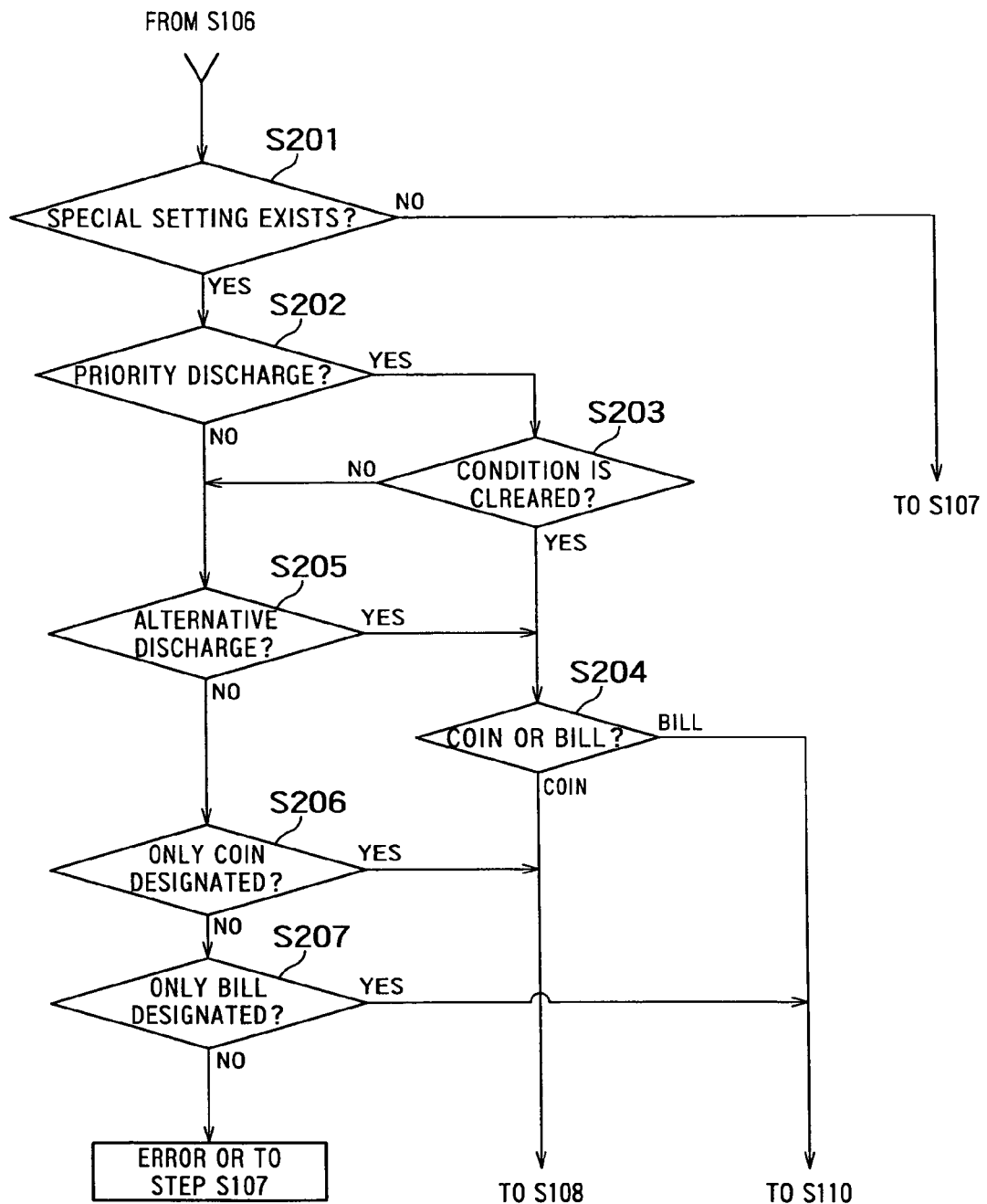
FIG. 8 is a flowchart showing an operation in the case of a special setting for discharging the change in the change discharging operation in FIG. 5.

Namely, before step S107 in FIG. 5, a content specially set by the person in charge of the cash register is checked in a judging step as shown in FIG. 8. This type of setting is, separately from the setting of the whole apparatus, done by the external terminal machine 300 etc on the basis of the mode selection set by the person in charge of the cash register before receiving the money. This selection is preferentially applied irrespective of the content of the setting done by the original setting unit.

To start with, after step S106, it is checked whether the special setting done by the person in charge of the cash register exists or not (step S201). If there is no such special setting, the operation proceeds to step S107 in FIG. 5.

If the special setting exists, it is checked whether the priority discharge is set or not (step S202). If there is a condition for the priority discharge, it is checked whether this condition is cleared or not (step S203). When this condition shows that the coin or the bill is set, the coin or the bill is selected based on this setting (step S204). In the case of the coin, the operation skips over to step S108. In the case of the bill, the operation skips over to step S110.

Whereas if the priority discharge is not set, it is checked whether an alternative discharge for discharging any one of the coin and the bill is set or not (step S205). The coin or the bill is designated based on this setting in step S204.

When the alternative discharge is not designated, and if only the coin is designated (step S206) and only the bill is designated (step S207), the operation skips over to step S108 and step 510, respectively.

If nothing applied in step S207, this is judged to be an error, or alternatively the operation loops back to step S107 in FIG. 5 in accordance with the original setting in a way that simply ignores this subroutine.

Fifth Embodiment

Each of the schemes of the first and second embodiments is that the setting unit arbitrarily sets the denominations for the plurality of storing/discharging sections, however, even after this setting has been done, the person himself or herself in charge of the cash register can arbitrarily set the money storing destinations (storing/discharging sections) when starting the transaction. This setting can be performed by use of the key operation unit t1 such as the keyboard of the control terminal machine T.

This scheme enables the money storing destinations to be changed with the high usability. For example, it is advantageous that the money storing destination having a possibility of being frequently replenished with the money is set in an easy-to-handle position.

Sixth Embodiment

As discussed above, the POS terminal issues the payment instruction about the denominations and the number of coins or bills, however, there might be a case in which the change discharger of the cash register shows a deficient amount of money. This deficiency might occur in such a case that the money in the change discharger is taken out by a method other than the regular method due to a jam etc.

In such a case, if the change discharger of the cash register stops at that point of time, the subsequent processes get stagnated, and hence the money is discharged in the way of being replaced by another denomination so as to attain the same amount of money.

For example, if deficient of the designated number of bills for an instruction of discharging five sheets of 5000-yen bills, the money is discharged in a way that replaces the deficiency with the 1000-yen bills.

Thus, if the money in the change discharger in the cash register is deficient for the payment instruction is given from the POS terminal, a stop of the process in the course of the repayment can be avoided by enabling the substitute payment to be done.

Incidentally, in the similar case, it is also feasible to repay a payable amount of money within the range of the payment instruction. In this case, though the person in charge of the cash register pays the money from a reserved amount of changes prepared beforehand, the stop of the process can be avoided.

Seventh Embodiment

In the embodiments discussed above, the bills and coins, having the similar currency characteristics, of the different countries can be simultaneously dealt with.

This type of example is that the U.S. dollar and the Canadian dollar are similar in their designs and can be therefore dealt with together.

Hence, the discriminating unit discriminates between the bills and coins, having the similar currency characteristics, of the different countries, and the storing/discharging unit stores and discharges these bills and coins.

Thus, in the case of simultaneously dealing with the bills and coins of the plurality of countries, the possible management is that the receipt-and-payment-enabled countries are set, or alternatively the receipt-enabled countries and the payment-enabled countries are individually set.

Moreover, similarly in the case of simultaneously dealing with the bills and coins of the plurality of countries, as for the payment when receiving the bills and coins of one country, it is possible to select the payment of the money of one country and the payment of the money of another counter.

Furthermore, thus, in the case of simultaneously dealing with the bills and coins of the plurality of countries, when receiving the money of one country and paying the money of another country, or conversely when receiving the money of another country and paying the money of one country, a rate conversion is automatically conducted, and the amount of payment can be determined on the side of the change discharger.

Eighth Embodiment

In the respective embodiments discussed above, the money storing/discharging units are provided on the denomination-by-denomination basis, and all of the provided money storing/discharging units are set as the units for the recycle target moneys. All of the money storing/discharging units are not, however, necessarily set as the units for the recycle target moneys at all times. For example, the maximum-valued bill is not employed as a change and does need recycling.

Therefore, a possible scheme of an eighth embodiment is that only part of the money storing/discharging units provided on the denomination-by-denomination basis are set as the units for discharging the bills and coins, while remaining units are not set for the recycle target moneys. To be specific, only part of the storing/discharging sections can be set as the payment-enabled (recycle-enabled) sections. Accordingly, the non-recycle bills and coins of the denominations in mixture are stored in one single storing/discharging unit, or alternatively can be stored in a money collecting unit aiming at collecting the bills and coins, which is provided in the apparatus. This money collecting unit is capable of, if the money of the payment-disabled denomination is deposited, directly storing this money without being stored in the money storing/discharging unit.

Incidentally, in this case, it is desirable to inhibit the money of the minimum-valued denomination from being paid out. Take Japan for example, there is no alternative for 1-yen in coin and 1000-yen in bill, and therefore the bills and coins of these denominations should be invariably set as the payment target moneys.

Ninth Embodiment

Moreover, as described above, the maximum-valued money is excluded from the recycle target moneys, and hence the possible management is such that the high-valued bills and coins can be deposited unless rejected once. For instance, the 100-dollar bill in the U.S.A. is once rejected and returned, then again deposited after displaying a want-to-deposit-100-dollar-bill query message, in which case the 100-dollar bill is stored, and the transaction is implemented.

With this contrivance, the user gets prudent for depositing the high-valued bills and coins and is prompted to deposit the recycle target bills.

Tenth Embodiment

On the occasion of paying the bills and coins from the coin storing/discharging units and the bill storing/discharging units, such control is performed as to minimize the number of payment bills and coins.

There have already been made a variety of proposals for minimizing itself the number of the payment bills and coins, and, though an in-depth description thereof is omitted, for example, this minimization can be attained by sequential allocation from the higher-valued bills and coins within the range of the amount of the payment money.

In this case, the minimum-count payment money can adopt any one of the following conditions such as:
 (a) preferential discharge of any one of the coin and the bill;
 (b) discharge of any one of the coin and the bill;
 (c) discharge of only the coin;
 (d) discharge of only the bill; and
 (e) preferential discharge of one type of money having the larger residual quantity.

The determination of the payment money can be made in the same procedure as in FIG. 8.

Eleventh Embodiment

The plurality of storing/discharging units can be also allocated to the same denomination. This contrivance enables a speed of the payment to be improved.

Specifically, the plurality of storing/discharging units is allocated to the denomination having the high payment frequency, wherein it is feasible to select a mode of paying a plurality of bills and coins from the single storing/discharging unit and a mode of paying the money from the plurality of storing/discharging units allocated to the same denomination.

Take Europe for instance, as shown in FIG. 9, the three storing/discharging units are provided for 1 euro, and the two storing/discharging units are provided for 2 euros. In the case of paying the 2 euros, one piece of 2-euros currency is paid out of the 2-euro oriented storing/discharging unit or two pieces of 1-euro currencies are discharged in parallel out of the two 1-euro oriented storing/discharging units. In the case of paying 3 euros, three pieces of 1-euro currencies are discharged from the three 1-euro oriented storing/discharging units. If the payment is within a 4-euro range, two pieces of 2-euro currencies are paid out of the two 2-euro oriented storing/discharging units on a one-by-one basis. Owing to this contrivance, the payment in a range of 1 euro through 4 euros can be done almost the same speed as the one piece of 1 euro is paid out, whereby the payment processing time can be reduced.

This type of allocation of the storing/discharging units entails enabling keeping track of the discharge when an error occurs such as prescribing the discharge priority with respect to the storing/discharging units allocated to the same denomination.

Furthermore, in the case of paying the money from the plurality of storing/discharging units for the same denomination, an available setting mode is to set whether the discharge continues till one unit gets empty or the decreases in the numbers of stored currencies are equalized by alternately paying the currencies out of the units.

Twelfth Embodiment

Moreover, the number of wrapped coins can be set for the denomination to which the recycle coins are allocated for every storing/discharging unit.

This scheme intends to be flexible to a difference in the number of coins contained in the wrapped coins (coin roll) according to the country.

Moreover, based on a premise of this number of wrapped coins, if an in-machine remainder is less than a predetermined amount of money, the control terminal machine T is controlled to make a replenishment request, and it may be effective to display the data on the operation/display unit 112.

A display example on the operation/display unit 112 is shown in a table of FIG. 10. Herein, the discussion will be made on such an assumption in the case of the U.S.A. that 50 pieces, 40 pieces, 50 pieces and 40 pieces are set as the numbers of wrapped coins of 1 cent, 5 cents, 10 cents and 25 cents, and 120, 100, 100, 120 are given as fixed amount residual value counts of the coins that should be left in the machine.

Supposing that in-machine on-hand money counts of the coins actually left in the machine are the count values shown in the second column (field) in this table, deficient money counts are obtained by subtracting the in-machine on-hand money counts from the fixed amount residual value counts. Then, the numbers of wrapped coin rolls needed for replenishing these deficient money counts are acquired. The replenishment is conducted through this operation, however, a fraction of the roll count can be selectively rounded off or rounded up.

The management described above enables the replenishing operation to be done efficiently and adequately also in the countries, which are different in their unit counts of wrapped coins.

Thirteenth Embodiment

A scheme of a thirteenth embodiment is that the bills and coins of other countries can be stored in the storing/discharging units set as discharge-disabled units.

This scheme intends to cope with a point that the bills and coins of other countries circulate in a certain country as the case may be, however, none of tangible measures are taken at the present.

A typical example may be a case of the U.S.A., in which the Canadian coins circulate. In the U.S.A., the Canadian 1 dollar circulates with the same value as the U.S. 1 dollar has, however, it does not happen that the financial institutions recycle the Canadian 1 dollar coins.

On the other hand, in the U.S.A., both of the 1 dollar coins and 1 dollar bills circulate, however, the bills are always paid out for the changes, and hence the 1 dollar coins are collected but not discharged. Therefore, as shown in FIG. 11, the storing/discharging unit for collecting the 1 dollar coins can be stored with other coins together with the 1 dollar coins, irrespective of the denominations of the coins. The stored Canadian coins are not paid out, and therefore this type of management can be performed. The U.S. 1 dollar coins and the Canadian coins (of the denominations in mixture) are simultaneously collected. Note that the should-be-stored place is not necessarily the storing/discharging unit, and a dedicated storage box is also available.

This management does not involve providing a new storing/discharging unit or enables the occupied area of the storing/discharging units to be reduced and the efficient recycle operation to be performed.

Fourteenth Embodiment

A fourteenth embodiment has a scheme of making it possible to clarify where the money deposited into the cash register belongs to.

For attaining this scheme, the fourteenth embodiment involves:

(1) limiting a POS register mode enabling the change discharger to receive the money and determining whether the money deposited in the POS mode belongs to a shop or the customer; and (2) setting a first event by which to enable the money to be deposited in the deposit-enabled POS mode, setting a second event by which to disable the money from being deposited, setting a deposit-disabled state during the transaction from a relation between these events and a deposit trigger timing, and distinguishing between the deposit of the anterior customer and the deposit of the posterior customer.

To begin with, as for a POS register mode, a [transaction mode] for the customer to settle the shopping is a mode enabling the change discharger to receive the money from the customer. By contrast, a [replenishment mode] for replenishing the deficient money is a mode of dealing with only the money of the shop but accepting none of the money from the customer.

Figure 12:
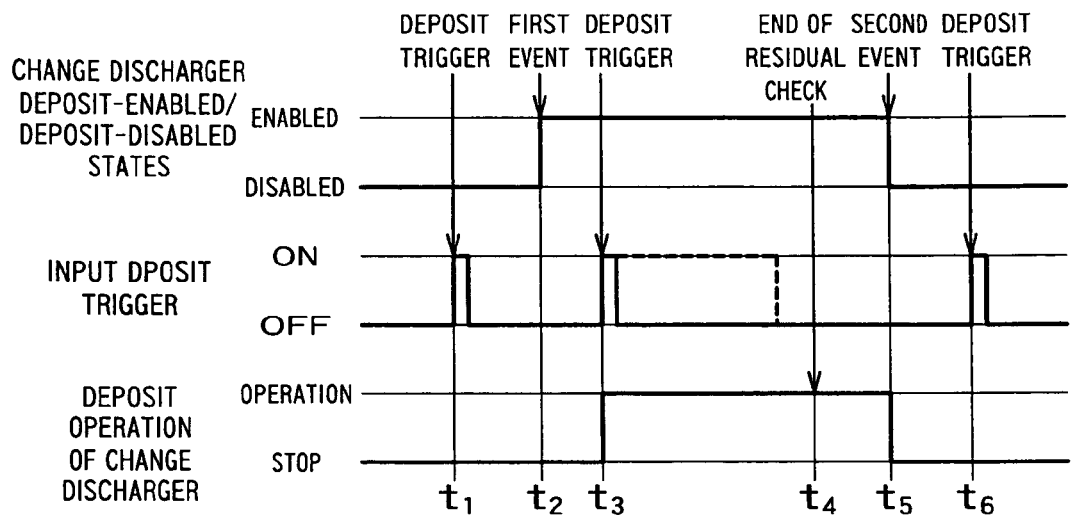
FIG. 12 is a timing chart showing a relation between a deposit trigger and an event.

FIG. 12 is a timing chart showing a relation between the deposit trigger and the event.

FIG. 12 illustrates that when the change discharger is disabled from receiving the money, even if the deposit trigger is set ON at timing t1, the change discharger does not perform the money receiving operation.

After occurrence of the first event enabling the money to be received at timing t2, the deposit trigger is accepted at timing t 3, and the change discharger gets into a status of executing the money receiving operation.

After finishing the money receiving operation, it is checked at timing t4 whether the residual money exists at the coin receiving port or the bill receiving port, and the change discharger stops the money receiving operation. In this status, when the next deposit trigger is set ON, the change discharger performs the money receiving operation.

Upon the occurrence of the second event enabling the money to be received at timing t5, the change discharger is disabled from receiving the money. Even when the deposit trigger occurs at timing t6, the change discharger does not conduct the money receiving operation.

To summarize what has been described so far, after the first event, the money can be received till the second event, and, when the deposit trigger is set ON, the change discharger starts the money receiving operation. After the second event, the money can not be received till the first event, and, even when the deposit trigger is set ON, the change discharger does not perform the money receiving operation.

Next, a relation between the POS register mode and the event will be explained.

At first, when the POS register mode is the [transaction mode], the first event enabling the money to be received must be an event surely showing that the transaction is underway. For instance, the first event is applied to a transition to a transaction-enables status by pressing the key for terminating the last transaction, a scan of the first commercial product, an input of finishing the scan and a press on a money payment selection key. Furthermore, the second event must be an event surely showing that the customer has completed the deposit. The second event is applied to, for example, pressing a deposit receiving confirmation key at the POS register and pressing a deposit amount confirmation key on the customer side.

Accordingly, in the [transaction mode], when satisfying the two conditions such as the occurrence of the deposit trigger for starting the money receiving operation between the first event and the second event, the money can be treated as the deposit from the customer for the transaction of this time.

Furthermore, when the POS register mode is the [replenishment mode] permitting the money replenishment at the shop, when a replenishment command is valid, and when the money is received upon selecting this command, the money can be treated as the deposit at the shop.

As for the event in the [replenishment mode], the first event must be an event surely showing that the replenishment is underway. The first event is applied to an input of starting the replenishment through a menu of the POS register and a key of the change discharger. Furthermore, the second event must be an event surely showing that the replenishment has been completed. The second event is applied to an input of finishing the replenishment through the menu of the POS register and the key of the change discharger and to a termination of the replenishment menu.

The deposit trigger is applied to pressing a start key of the change discharger, detecting the deposit into the change discharger and receiving a deposit start command from the POS register. A plurality of these triggers can be used in combination.

Accordingly, in the [replenishment mode], when satisfying the two conditions such as validating the replenishment command and proving that the money is received upon selecting the replenishment command, the money is received at the shop. A characteristic in this case is that the replenishment in the replenishment permitting command is confirmed by the replenishment command, and hence it is clear that the money of the shop is replenished.

Incidentally, whichever mode the operation may be in, it is feasible to adopt a [precedence deposit mode] in which the deposit is started before determining an amount of settlement by setting the first event.

Furthermore, the permission can be set on a mode-by-mode basis, for instance, it is possible to arbitrarily set whether the replenishment is permitted in the [transaction mode] or not.

Moreover, such a scheme can be set that the change discharger, when detecting the input of the money if disabled from depositing, operates to execute the following processes, singly or in combination. Namely, the change discharger gives an alarm;

the change discharger returns the money by rejecting the inputted money; and the change discharger notifies the POS register, and the POS register carries out a process in response to the notification.

The methods described above clarify where the received money distinctively belongs to, and enable the accuracy of the counting operation and the operation efficiency to be improved.

Fifteenth Embodiment

Figure 13:
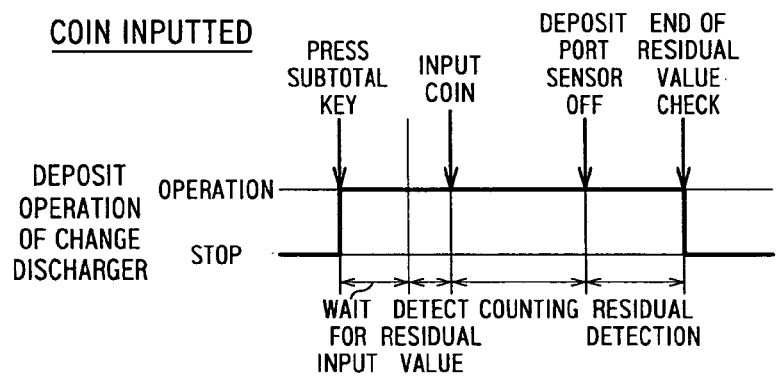
FIG. 13 is an explanatory timing chart showing an operation in the case of inputting the coins and also showing a start through an end of a money receiving operation of the change discharger in a conventional method of starting counting the coins.
Figure 14:
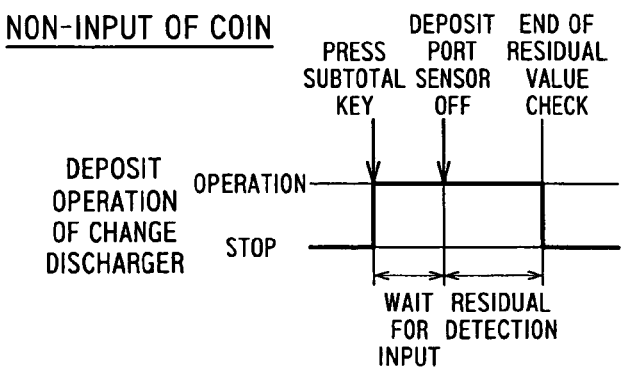
FIG. 14 is an explanatory timing chart showing the operation in the case of inputting none of the coins and also showing the start through the end of the money receiving operation of the change discharger in the conventional method of starting counting the coins.

To start with, a problem about the conventional method (3) of starting counting the coins is clarified. FIGS. 13 and 14 are explanatory timing charts showing, from the beginning to the end, the operation based on the method (3) and the money receiving operation of the change discharger. FIG. 13 shows a case where the coins are inputted, while FIG. 14 shows a case where the coins are not inputted, respectively.

In the case where the coins are inputted as shown in FIG. 13, a wait-for-input status occurs by pressing a subtotal key. Within a period of this status and a residual amount detection period, when the coins are inputted and a deposit port sensor is switched ON, the coins are counted. When the deposit port sensor is switched OFF upon finishing counting the coins, the detection of the residual quantity is started. If the deposit port sensor is kept OFF during a fixed period of detection of the residual quantity, the money receiving operation is terminated. In this case, the period of residual quantity detection time is originally unnecessary.

While on the other hand, even when the coins are not inputted as shown in FIG. 14, the wait-for-input status occurs by pressing the subtotal key, and the deposit port sensor performs the residual quantity detecting operation for checking whether the residual coins exist or not, with the result that the operation can not proceed to the next step until finishing the check of whether the residual coins exist or not. In this case, the time of waiting for the input of the coins and the time of detecting the residual quantity are unnecessary, and a disadvantage is therefore such that these futile periods of processing time elongate the transaction.

Such being the case, a fifteenth embodiment provides a control method causing none of such futile periods of processing time.

Figure 15:
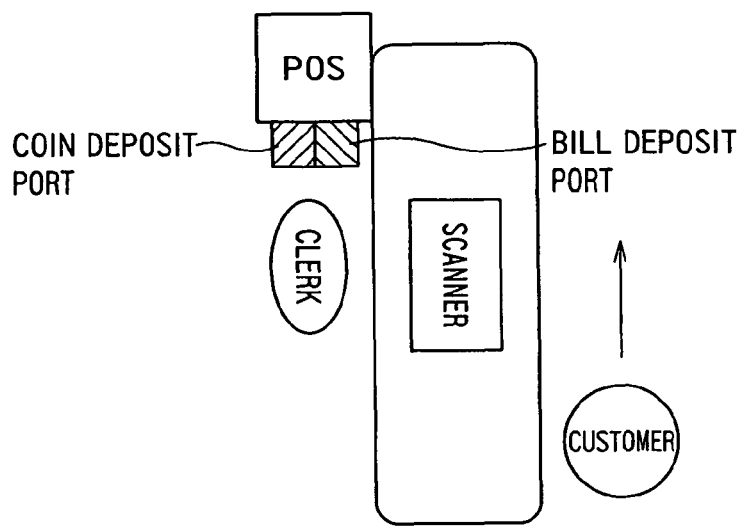
FIG. 15 is a schematic diagram showing a layout of a POS register to which the present embodiment is applied, a customer, a clerk at a cash register and a scanner.
Figure 16:
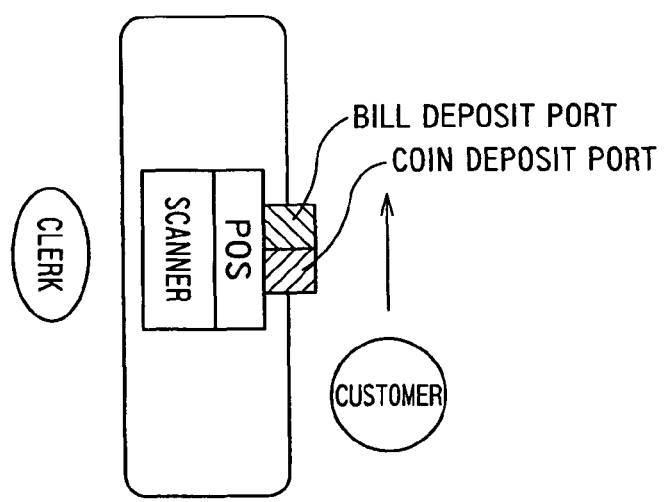
FIG. 16 is a schematic diagram showing the layout of the POS register to which the present embodiment is applied, the customer, the clerk at the cash register and the scanner.

FIGS. 15 and 16 are diagrams each showing an outline of a layout where the POS register to which the fifteenth embodiment is applied, the customer, a clerk at the cash register and a scanner are disposed. In any case, the clerk is positioned on the left side of the cash register stand, and the customer advances along the path on the right side toward an upper area from a lower area (as viewed in the drawings).

In the case of FIG. 15, the scanner for reading barcodes of the commercial product is simply placed on the stand, and the POS terminal is provided aside the clerk at the cash register. Accordingly, the coin deposit port and the bill deposit port are directed to the clerk side. The clerk reads the (barcodes of) commercial product received from the customer with the scanner, then receives the payment money, and inserts the money into bill deposit port and the coin deposit port, thus conducting the settlement.

Note that when making the settlement with a card etc other than the cash, the clerk receives the card etc and settles the payment by processing the card with a card processing unit of the POS register.

On the other hand, in the case of FIG. 16, the scanner and the POS register are arranged in a side-by-side relation on the stand, the scanner is directed to the scanner, while the bill deposit port and the coin deposit port of the POS register are directed to the customer. This layout is suited to a self-settlement in which the customer himself or herself makes the settlement. In this type of layout, the clerk receives the commercial product brought in by the customer and scans the barcodes with the scanner, and the customer, in the case of seeing an amount of money displayed on the POS register and paying this amount in cash, inputs the bills into the bill deposit port and the coins into the coin deposit port by himself or herself. When the customer desires for the payment by the credit card, the clerk settles the payment by processing the credit card in a way that uses a card-dedicated processor connected to the POS register.

Figure 17:
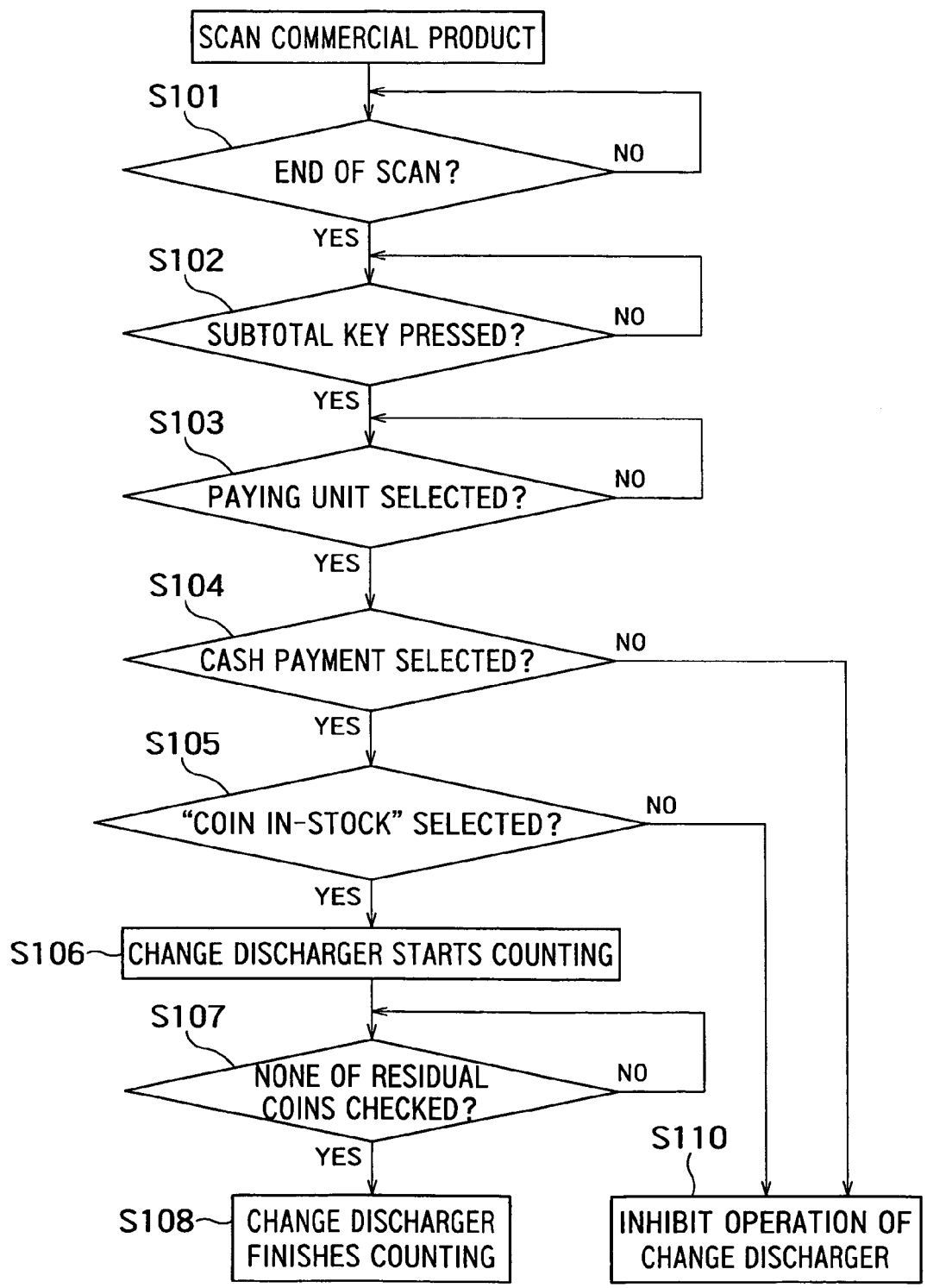
FIG. 17 is a flowchart showing a control operation in the embodiment.

FIG. 17 is a flowchart showing the control operation in the fifteenth embodiment.

When the customer hands over the commercial product for a purchase to the clerk, the product is scanned for reading the barcodes (step S101).

At a point of time when finishing the scan, the clerk comes to a standby status for pressing the subtotal key (step S102). When the subtotal key is pressed, there occurs a wait-for-input status for selecting a payment method, i.e., in cash or by an alternative, e.g., by the credit card (step S103).

It is checked whether the payment method selected corresponding to this input is the payment in cash or not (step S104). If the payment in cash is not selected, the change discharger is controlled not to operate (step S110).

Next, even when the payment in cash is selected, it is selected whether the coins are used for the payment or not (step S105). If the coins are not used, the change discharger is controlled so that the unnecessary change discharger does not operate (step S110).

If the option of using the coins is made, the change discharger starts counting the coins (step S106). Then, it is checked whether there are not any coins remaining there (step S107). When none of the remaining coin is confirmed, the change discharger finishes counting (step S108).

Herein, it is simple and easy for getting the change discharger to start counting that a special key is provided and then pressed. This will be described with reference to FIGS. 18-20.

Figure 18:
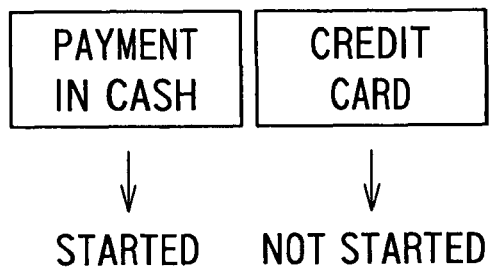
FIG. 18 is an explanatory diagram showing a first example of a special key provided for the change discharger to start counting.

For instance, a first example is, as shown in FIG. 18, that a [cash payment] key is provided in addition to the hitherto-existing [credit card] key, and, when pressing the [cash payment] key, the coin change discharger starts counting. The first example takes a configuration with an omission of step S105 in FIG. 17. Accordingly, the coin change discharger does not start counting in the case of the payment by the credit card, and the processing can be speeded up more for that.

Figure 19:
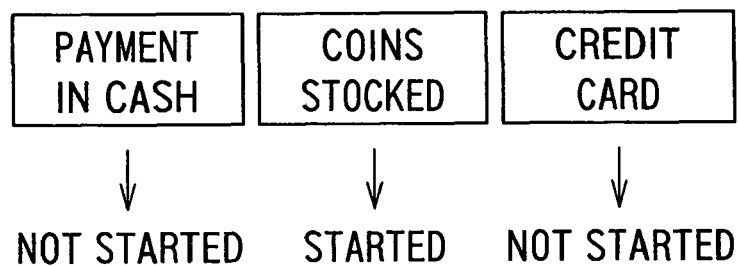
FIG. 19 is an explanatory diagram showing a second example of the special key provided for the change discharger to start counting.
Figure 20:
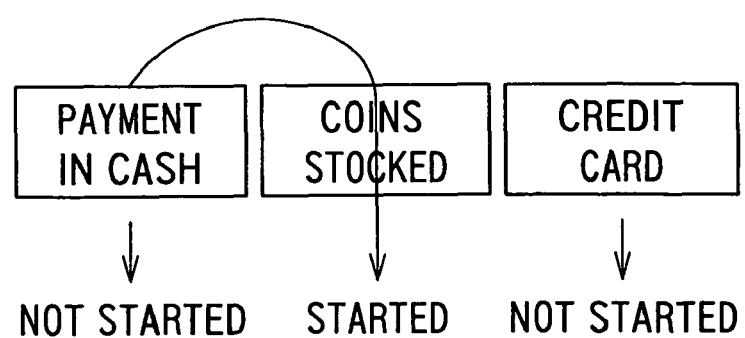
FIG. 20 is an explanatory diagram showing a third example of the special key provided for the change discharger to start counting.

A second example is, as shown in FIG. 19, such that a [coin stocked] key is provided in addition to the [credit card] key and the [cash payment] key, and, only when pressing the [coins stocked] key, the coin change discharger starts counting. The second example corresponds to a control procedure in FIG. 17.

A third example is that though the [credit card] key, the [cash payment] key and the [coins stocked] key are provided in the same way as in the case of FIG. 19, sequencing is done between the [cash payment] key and the [coins stocked] key, wherein the start of counting by the coin change discharger is not validated until the [coins stocked] key is pressed after pressing the [cash payment] key.

Note that the operation of the coin change discharger may also be started upon detecting the deposit by the deposit port sensor as well as by using the start key.

Owing to the methods described above, the coin change discharger starts counting based on the choice of the payment method, whereby the coin change discharger surely starts operating only when the cash (coins) is received but does not operate when the cash (coins) is not received. Thus, it is feasible to prevent the occurrence of the extra processing time and to speed up the transaction because of the waiting time being reduced to a greater degree for that.

Furthermore, all the processes are carried out by operating the POS register, and hence a possibility of discrepancy between the operations decreases as compared with operating the keys of the change discharger and the sensors.

The operations described above can be realized by coin change dischargers and bill change dischargers taking types other than the coin change discharger 1A illustrated in FIG. 2 and the bill change discharger 1B illustrated in FIG. 3. Some examples thereof will hereinafter be explained.

(First Another Example of Coin Change Discharger)

(1) Configuration

Figure 21:
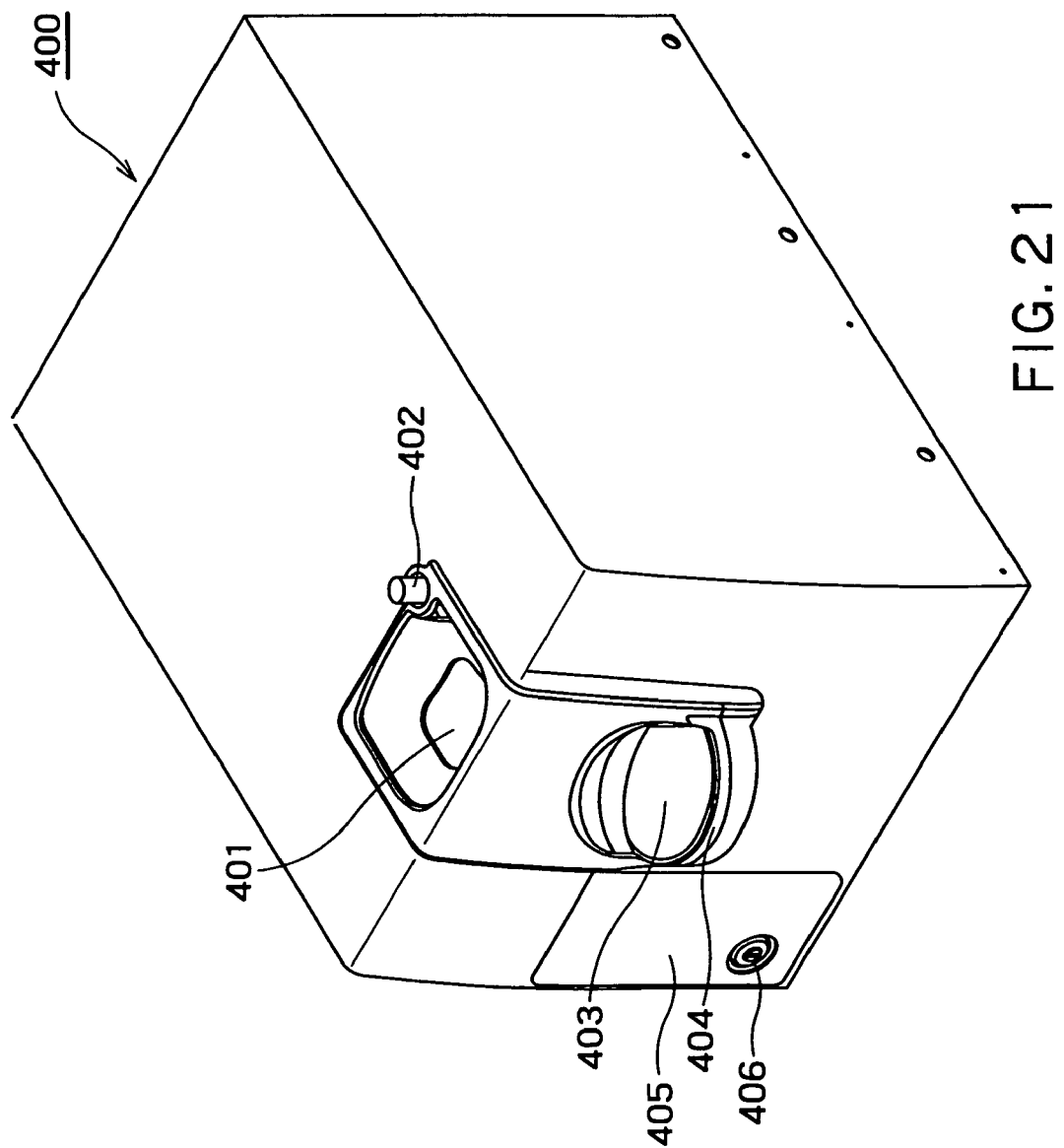
FIG. 21 is a perspective view illustrating an external appearance in another example of the coin change discharger.
Figure 22:
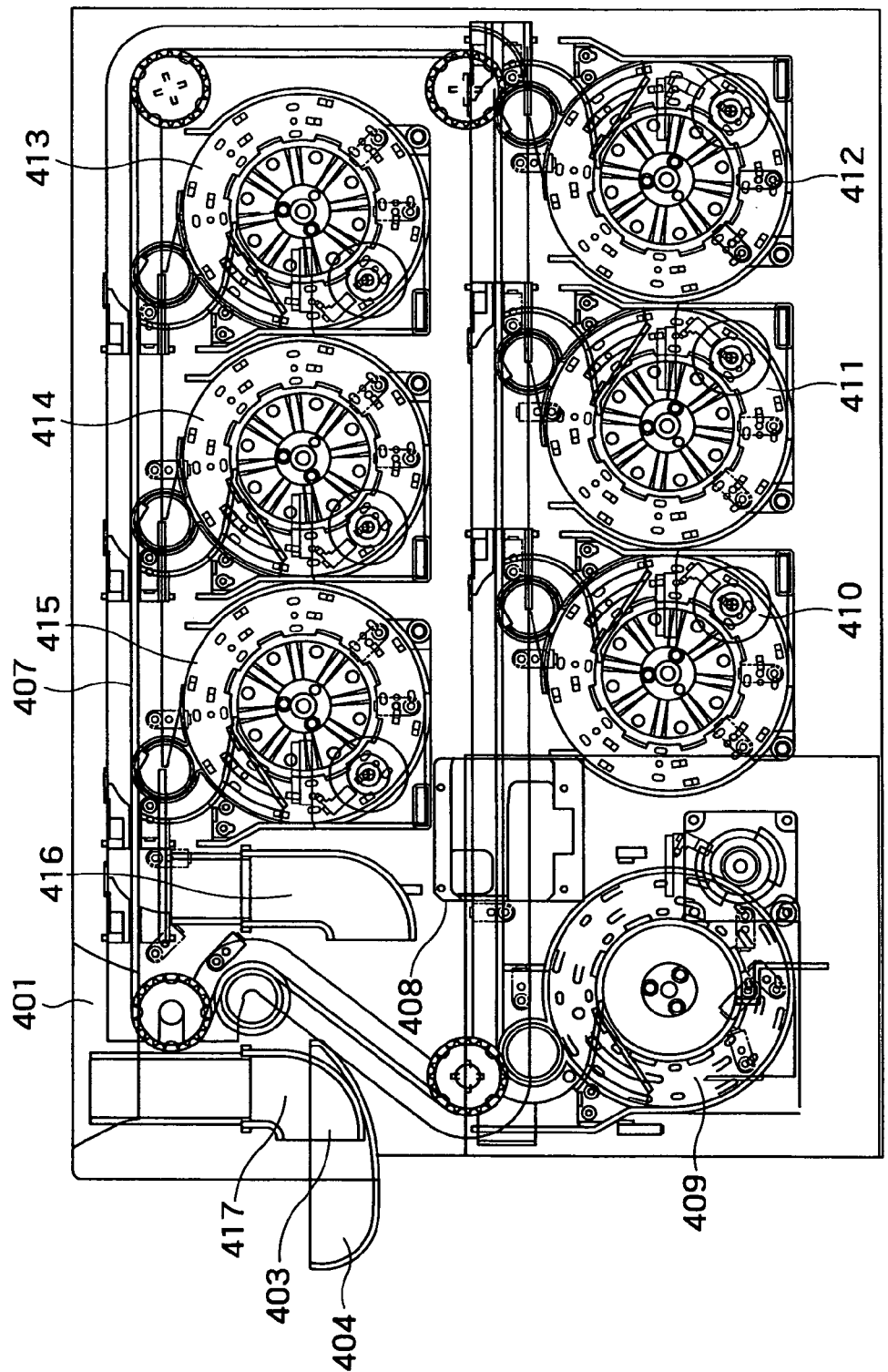
FIG. 22 is a sectional view illustrating an outline of an internal structure in another example of the coin change discharger shown in FIG. 21.

FIG. 21 is a perspective view illustrating an external appearance of a coin change discharger 400. FIG. 22 is a schematic sectional view showing an internal structure thereof.

A coin receiving port 401 via which the coins are inputted into the machine body and a deposit start button 402 used for starting the money receiving operation, are provided on the upper surface on the front side of the machine body of the coin change discharger 400. Provided at the front of the machine body are a coin ejection port 403 via which the coin are ejected outside the machine body and a front-side payment tray 404 for receiving the coins ejected from the coin ejection port 403. Moreover, a coin cassette 405 is detachably attached to the left-side front part of the machine body. The coin cassette 405 is provided with a lock unit 406 that locks and unlocks the cassette 405 by a key operation in a fitted state within the machine body.

Referring to FIG. 22, an annular carrying unit 407 for carrying the coins is provided on the surface side within the machine body. A discriminating unit 408 for discriminating at least between the denominations, authenticity and falseness, and normality and damageability of the coins carried by the carrying unit 407, is disposed within a route of the carrying unit 407. Disposed Furthermore within this route are a storing/feed-out unit 409 serving as a feed-out means capable of receiving the coins inputted into the coin receiving port 401, then feeding out the coins one by one to the carrying unit 407 and taking in and out the coins one by one with respect to the carrying unit 407, six pieces of storing/outputting units 410-415 capable of storing the coins according to the types such as the denominations and taking in and out the coins one by one with respect to the carrying unit 407, a receipt money temporary reserving unit 416 serving as a coin temporary reserving device capable of temporarily reserving the received coins, and a payment money temporary holding unit 417 serving as a coin temporary reserving device capable of temporarily reserving the payment coins in a way that connects these components to each other. The discriminating unit 408 is disposed between the storing/feed-out unit 409 and the foremost storing/outputting unit 410. A receipt chute for guiding the coins inputted into the coin receiving port 401 to the storing/feed-out unit 409 is disposed between the coin receiving port 401 and the storing/feed-out unit 409.

The carrying unit 407 includes a coin passage, taking annular shape, for arranging the coins in one row and thus guiding the carried coins. The carrying unit 407 Furthermore includes an endless carrying member for carrying the coins within the coin passage. The coin passage has a passage surface to which the face of the coin gets contiguous. The coin passage also has guide side plates on both sides for guiding peripheral edge from both sides of the passage surface. The carrying member is constructed of an endless belt. The carrying member is formed with a plurality of protrusions protruding from the belt surface that faces the passage surface at predetermined pitches in a longitudinal direction of the belt. The belt is stretched in a rotatable manner between a plurality of pulleys in a way that travels through a central area of the coin passage. Then, the belt receives the coin between two adjacent solid portions and carries the coin as it rotates while pushing the coin with the protrusions. Furthermore, the pulleys are rotated forward and backward by a motor, thereby rotating the belt forward and backward. The belt is rotated in a first direction (which will hereinafter be referred to as a deposit carrying direction) defined as a forward direction so as to move from the front side toward the rear side as when receiving the money in a way that feeds the coins out of the storing/feed-out unit and stores the coins in the storing/outputting unit. On the other hand, the belt is rotated in a second direction (which will hereinafter be referred to as a payment carrying direction) defined as a direction reversed to the deposit carrying direction as when paying the money in a way that feeds the coins out of the storing/outputting unit and outputs the coins into the coin output port. Accordingly, the forward and reverse rotations of the belt enable the coins to be carried both in the forward direction and in the reverse direction within the coin passage.

Allocation members are disposed in respective positions at coin take-in/take-out port of the storing/feed-out unit 409 and at the coin take-in/take-out ports of the storing/outputting units 410-415 on the coin passage. The allocation members selectively allocate the coins, depending on whether the coins are taken in and out of the coin take-in/take-out ports or the coins carried by the carrying unit pass through on a downstream side in the carrying direction. Furthermore, the allocation members are disposed at a coin inlet of the receipt money temporary reserving unit 416. The allocation member selectively allocates the coins, depending on whether the coins are branched off or the coins carried by the carrying unit pass through on the downstream side in the carrying direction. These allocation members are, though different in their directions etc, the same in terms of their basic structure for allocating the coins and their operation.

Next, each of the storing/outputting units 410-415 includes a rotary disc rotatable about a rotational axis in a position inclined at a predetermined angle to the horizontal direction, a hopper for reserving the coins between the surface side of the rotary disc and the hopper itself, and a handover disc disposed in the vicinity of the coin inlet/outlet. Then, when the rotary disc rotates in a feed-out rotating direction, each pick-p member on an inner peripheral side holds the coins one by one between the coin peripheral edge holding portion and the rotary disc, and picks up the coin onto an upper area of the rotary disc. Then, each pick-up member on the outer peripheral side pushes the coin picked up by each pick-up member on the inner peripheral side onto the upper area of the rotary disc toward the coin inlet/outlet, and hands over the coin to the handover disc.

The handover disc is rotatably disposed in a position extending over the guide passage and the coin passage so that the surface of the handover disc gets flush with the rotary disc and with the passage surface. Protrusions protrude from an outer peripheral ridge portion of the handover disc. The protrusions abut on and thus feed out the coin toward the coin passage from the rotary disc. The protrusions rotate synchronizing with the belt on the coin passage, thereby feeding out the coins or performing the reversed operation.

The receipt money temporary reserving unit 416 is disposed upwardly of the coin cassette 405 and the storing/feed-out unit 409, and includes a chute unit serving as a coin reserving member. Thus chute unit takes a hollowed cylindrical shape. A horizontal aperture for receiving the coins allocated by the application members from the coin passage is formed in an upper area of the chute unit. Another aperture opened sideway is formed in a lower area of the chute unit. A lower side of the chute unit is bent toward the aperture.

The payment money temporary holding unit 417 is disposed upwardly of the payment tray and can receive from above the coins discharged out of the coin passage or a payment passageway portion.

(2) Deposit Operation

The deposit coins inputted into the coin receiving port 401 are batchwise received and reserved in the storing/feed-out unit 409. To be specific, when a deposit command is issued by manipulating the deposit start button 402, the storing/feed-out unit 409 and the carrying unit 407 are respectively driven in a way that sets the chute unit of the receipt money temporary reserving unit 416 to a rotational position for the reservation and sets the chute unit of the payment money temporary holding unit 417 to a position of the payment temporary reserving unit. With this contrivance, the coins in the storing/feed-out unit 409 are fed out one by one into the coin passage. The coins fed out into the coin passage are carried one by one by the belt in the deposit carrying direction. The discriminating unit 408 discriminates between the coins carried through within the coin passage. As a result of the discrimination by the discriminating unit 408, the coins discriminated as the normal coins are allocated to the receipt money temporary reserving unit 416 and reserved in the closed chute unit. As the result of the discrimination by the discriminating unit 408, the coins, which are not discriminated as the normal coins, are carried and discharged into the payment money temporary holding unit 417 and returned after being discharged via the payment chute unit into the payment tray 404. Furthermore, when a reservation command is issued after the deposit coins have been temporarily reserved, the coins reserved in the chute unit of the receipt money temporary reserving unit 416 are fed into the storing/feed-out unit 409 by rotating the chute unit of the receipt money temporary reserving unit 416. Thereafter, the storing/feed-out unit 409 and the carrying unit 407 are respectively driven. The coins in the storing/feed-out unit 409 are thereby fed out one by one into the coin passage. The coins fed out into the coin passage are carried by the belt in the deposit carrying direction. The discriminating unit 408 again discriminates between the coins carried through within the coin passage. As the result of the discrimination by the discriminating unit 408, the coins discriminated as the normal coins are allocated to the coin inlets/outlets of the respective storing/outputting units 410-415 from the coin passage by the allocation members of the storing/outputting units 410-415 stored with the coins of the corresponding denominations. The thus-allocated coins are thus stored into the storing/outputting units.

The coins, which are not, though once discriminated as the normal coins, discriminated as the normal coins as the result of the discrimination by the discriminating unit 408, pass through the positions of the storing/outputting units 410-415 on the coin passage and are allocated to the receipt money temporary reserving unit 416 by the allocation member of the receipt money temporary reserving unit 416. The allocated coins are fed in and thus stored in the coin cassette via the chute unit. Furthermore, when a stored coin count of each of the storing/outputting units 410-415 reaches a predetermined full count, the coins of the corresponding denomination after reaching the full count are treated as overflow coins. The overflow coins pass through the positions of the respective storing/outputting units 410-415 on the coin passage and are allocated to the receipt money temporary reserving unit 416 by the allocation member of the receipt money temporary reserving unit 416. The thus-allocated coins are fed in and stored in the coin cassette 405 via the chute unit. Then, when the temporarily-reserved deposit coins are completely stored in the respective storing/outputting units 410-415 or in the coin cassette 405, the deposit process is terminated.

Moreover, upon issuing a return command after the deposit coins have been temporarily reserved, the position of the chute unit of the receipt money temporary reserving unit 416 is changed, and the coins temporarily reserved in the chute unit of the receipt money temporary reserving unit 416 are fed into the storing/feed-out unit 409. Furthermore, the storing/feed-out unit 409 and the carrying unit 407 are respectively driven in a way that sets the payment chute unit of the payment money temporary holding unit 417 to a position of the payment temporary reserving unit. The coins in the storing/feed-out unit 409 are thereby fed out on the one-by-one basis into the coin passage. The coins fed out into the coin passage are carried by the belt on the one-by-one basis in the deposit carrying direction. The thus-carried coins are discharged into the payment money temporary holding unit 417 from the front end defined as the terminal of the coin passage and returned by discharging the coins into the payment tray 404 via the payment chute unit.

(3) Payment Operation

Upon receiving a payment command containing the number and the denomination of the should-be-paid money or an amount of the should-be-paid money, the respective storing/outputting units 410-415 stored with the should-be-paid coins and the carrying unit 407 are individually driven in a way that sets the payment chute unit of the payment money temporary holding unit 417 to the position of the payment temporary reserving unit. The coins in the corresponding storing/outputting units 410-415 are fed out on the one-by-one basis into the coin passage. The coins fed out into the coin passage are carried on the one-by-one basis by the belt in the payment carrying direction. The discriminating unit 408 discriminates between the coins carried through the coin passage. In the case of outputting the coins from the plurality of storing/outputting units 410-415, the coins are output from any one of the storing/outputting units, and, after completing the output of the coins equivalent to the amount of payment from this storing/outputting unit, the coins equivalent to an amount of payment are output from the next storing/outputting unit, thus outputting the coins in sequence.

As the result of the discrimination by the discriminating unit 408, the coins discriminated as the normal coins are carried to the front end defined as the terminal of the payment passage portion, then discharged into the payment money temporary holding unit 417 and reserved in the payment chute unit thereof. On the other hand, as the result of the discrimination by the discriminating unit 408, the coins, which are not discriminated as the normal coins, are allocated by the allocation member of the storing/feed-out unit 409 to the storing/feed-out unit 409 from the coin passage and thus stored. The denominations of the coins, which are not discriminated as the normal coins, are recognized from carry-out timings of the coins carried out of the storing/outputting units 410-415 and from timings at which the coins are carried by the belt and reach the discriminating unit 408, and hence one coin is additionally output from each of the storing/outputting units 410-415 of the corresponding denominations. Then, the coins equivalent to the amount of payment are reserved in the payment chute unit, at which time the coins reserved in the payment chute unit of the payment money temporary holding unit are paid by discharging these coins into the payment tray. Furthermore, the coins, which are allocated from the receipt money temporary reserving unit 416 into the storing/feed-out unit without being discriminated as the normal coins, are fed out one by one into the coin passage. The coins fed out into the coin passage are carried on the one-by-one basis by the belt in the payment carrying direction. The discriminating unit 408 discriminates between the coins carried through the coin passage. As the result of the discrimination by the discriminating unit 408, the coins discriminated as the normal coins are allocated to the coin inlets/outlets of the storing/outputting units from the coin passage by the allocation members of the storing/outputting units stored with the coins of the corresponding denominations. The thus-allocated coins are stored in the storing/outputting units 410-415. As the result of the discrimination by the discriminating unit 408, the coins, which are not discriminated as the normal coins, pass through the positions of the respective storing/outputting units 410-415 on the coin passage, and are allocated to the receipt money temporary holding unit 416, thus storing the coins in the coin cassette 405 via the chute unit.

(Second Another Example of Coin Change Discharger)

(1) Configuration

Figure 23:
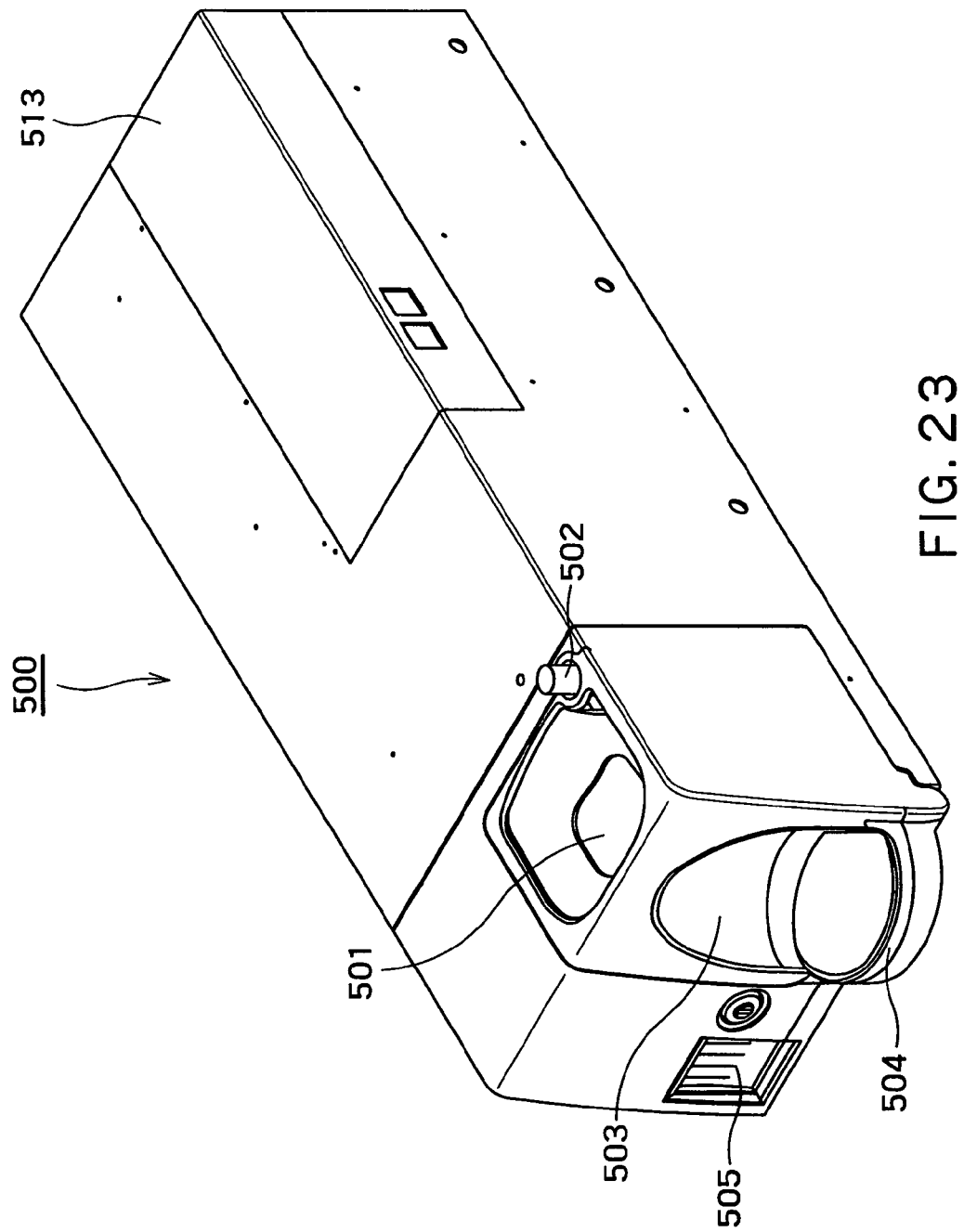
FIG. 23 is a perspective view illustrating an external appearance in still another example of the coin change discharger.
Figure 24:
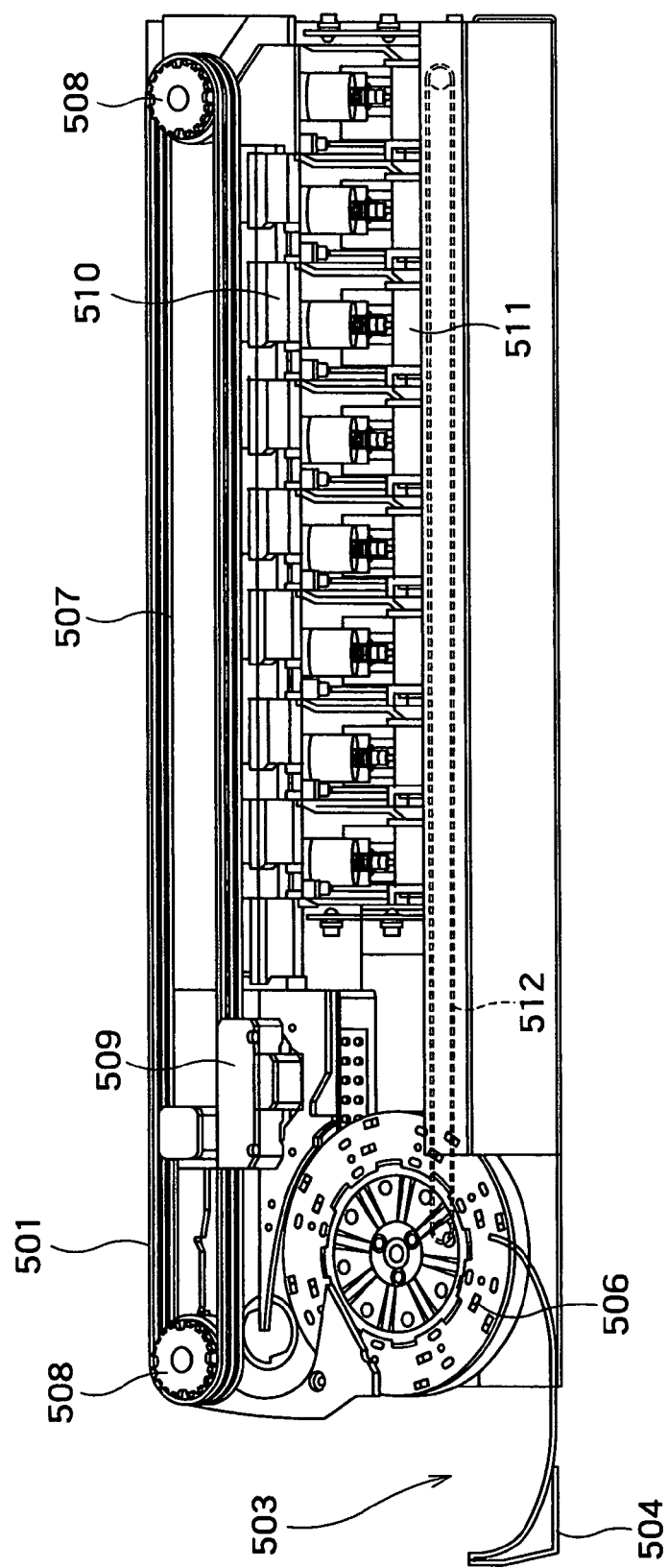
FIG. 24 is a sectional view illustrating an outline of the internal structure in still another example of the coin change discharger shown in FIG. 23.

Second another example exemplifies the coin change discharger having an extremely compact configuration. FIG. 23 is a perspective view illustrating an external appearance of a coin change discharger 500. FIG. 24 is a schematic sectional view showing an internal structure thereof.

A coin receiving port 501 via which to input the coins into the machine body and a deposit start button 502 used for starting the money receiving operation are provided on the upper surface of the front side of the machine body of the coin change discharger 500. Provided at the front of the machine body are a coin ejection port 503 via which the coin are ejected outside the machine body and a front-side payment tray 504 for receiving the coins ejected from the coin ejection port 503. Moreover, a reject port 505 is formed in the front surface on the left side of the machine body.

Referring to FIG. 24, the coin change discharger 500 includes a storing/feed-out unit 506, a receipt money carrying unit, a discriminating unit 509, a plurality of allocation members (branching members) 510, coin storing/discharging units 511 and a payment money carrying unit. The storing/feed-out unit 506 reserves and feeds out one by one the coins received from the coin receiving port 501. The receipt money carrying unit carries the coins fed out of the storing/feed-out unit 506 toward the rear side from the front side along the left-side surface of the machine body. The discriminating unit 509 discriminates between the coins carried by the receipt money carrying unit. The allocation members 510 allocate the coins carried by the receipt money carrying unit according to the types such as the denominations, corresponding to the result of the discrimination by the discriminating unit 509. The coin storing/discharging units 511 provided according to the types such as the denominations are disposed in sequence toward the rear side from the front side of the machine body, then get stored with the coins on a type-by-type basis, which are allocated by the respective allocation members 510, and can discharge the stored coins one by one toward the right-side surface of the machine body. The payment money carrying unit is disposed along the right side surface of the machine body and carries the coins discharged from the coin storing/discharging units 511 to a coin discharging port 503.

The storing/feed-out unit 506 includes a rotary disc rotatably driven by a motor about a rotational axis in a position inclined at a predetermined angle to the horizontal direction, a hopper for reserving the coins received via the coin receiving port in a non-aligned state between the surface side of the rotary disc and the hopper itself, and a handover disc disposed in such a position as to feed out the coins to the receipt money carrying unit from the upper side of the rotary disc.

The surface of the rotary disc is formed with a high-level portion at the center, a low-level portion in the outer peripheral area and a stepped portion therebetween. The low-level portion is provided with a pick-up member that picks up, when the rotary disc rotates in a feed-out rotating direction, the coins one by one onto the upper area of the rotary disc while holding the coin, and hands over the coin to the handover disc by pushing the coin. The high-level portion of the rotary disc is formed with a guide passage, inclined at the same angle as the rotary disc is, via which to feed out the coins picked up by the pick-up member onto the upper area of the rotary disc on the one-by-one basis to the receipt money carrying unit. The guide passage is configured by a passage surface to which one surface of the coin gets contiguous when carried and by guide portions for guiding from both sides the carried coin picked up by the pick-up member.

The receipt money carrying unit is constructed of a receipt money carrying belt 507 stretched between receipt money carrying pulleys 508 driven by the motor. The receipt money carrying unit includes a receipt money carrying passage formed, in continuation to the guide passage, extending to the rear side from the front side along the left-side upper portion within the machine body. The receipt money carrying passage is, in the continuation to the guide passage, configured by a passage surface, to which one surface of the coin gets contiguous when carried, inclined in the same way as the rotary disc is, and by guide portions for guiding from both sides the coin carried on this passage surface.

The rotation of the receipt money carrying belt 507 synchronizes with the feed-out of the coin fed by the rotary disc and the handover disc of the storing/feed-out unit 506. The coins fed out by the storing/feed-out unit 506 are received one by one between the neighboring protrusions of the receipt money carrying belt 507.

A plurality of alignment members is disposed at the inlet portion of the receipt money carrying passage. The alignment members align the coins, fed out into the receipt money carrying passage from the rotary disc, along the one-side guide portion, and thus get the coins to pass through. A discriminating unit 509 and a plurality of allocation members are disposed downstream of positions of these alignment member.

The discriminating unit 509 discriminates between the denominations, the authenticity and the falseness, and the normality and the damageability of the coins aligned by the alignment members by detecting materials and diameters of the coins, and judges whether the coins are acceptable within the machine body or not.

The allocation member located in the most upstream allocating position in the carrying direction is the reject coin oriented allocation member for allocating the coins unacceptable within the machine body. The allocation members disposed downstream of the reject coin oriented allocation member in the carrying direction are the allocation members for allocating on the type-by-type basis the coins acceptable within the machine body and each have the same structure.

A chute for leading the coins allocated by the allocation member to a reject return port, is disposed in the reject coin oriented allocating position located upstream most in the carrying direction. Type-by-type chutes for leading the coins allocated by the respective allocation members 510 to the type-by-type coin storing/discharging units 511, are disposed in the type-by-type allocating positions. A chute for leading the coins discharged from the terminal portion of the receipt money carrying passage to the coin storing/discharging unit positioned at the aftermost portion of the machine body, is disposed in the allocating position located downstream most in the carrying direction.

The type-by-type coin storing/discharging units 511 are arranged in a side-by-side relation sequentially from the front side of the machine body toward the rear side thereof. Each of the coin storing/discharging units 511 has a storage frame for storing the coins in the non-aligned state. A receipt coin storage port for receiving the coins allocated by the allocation members from the receipt money carrying passage, is formed upwardly of the storage frame.

A storing/discharging belt for sustaining the coins to be stored in the non-aligned state is disposed at the bottom of the storage frame. This storing/discharging belt is stretched, in bilateral directions of the machine body, around storing/discharging rollers rotatably axially supported in the horizontal direction with respect to the machine body. The storing/discharging belt is also stretched in a way that obliquely rises as it extends toward the downstream side from the upstream side in the coin carrying direction, i.e., toward the right-side payment money carrying unit from the left-side receipt money carrying unit. A stored coin discharging port for discharging the stored coins to the payment money carrying unit is formed downstream in the carrying direction of the storing/discharging belt.

The payment money carrying unit includes a payment money carrying belt 512 serving as an endless payment money carrying member extending in the front-and-rear directions of the machine body at the side portion on the side of the stored coin discharging ports of the plurality of coin storing/discharging units 511. The payment money carrying belt 512 is stretched around a plurality of payment money carrying pulleys rotatably axially supported in the horizontal direction with respect to the machine body. The payment money carrying belt 512 is rotated by the driving force of the motor so that the upper surface of the payment money carrying belt 512 moves toward the coin discharging port on the front side. The coin carrying surface of the payment money carrying belt 512 is surrounded by payment passage walls of side faces on both sides and a payment passage wall of an upper face. A single or a plurality of opening/closing doors 513 is secured, in an openable/closable manner about a spindle serving as a fulcrum, to the payment passage wall of the side face that faces on the outside of the machine body. The payment passage wall of the upper face is transparent and is provided in the openable/closable manner as the necessity may arise. The payment passage wall of the upper face is disposed at a height enabling the coins discharged from the stored coin discharging port of the coin storing/discharging unit to be received on the lower side of the payment passage wall of the upper face. An interval at which the payment passage wall of the upper face gets into a face-to-face relation with the coin carrying surface of the payment money carrying belt 512, is set smaller than a diametrical dimension of the minimum diameter coin dealt with by the coin change discharger.

(2) Deposit Operation

The clerk at the cash register inputs the deposit coins into the coin receiving port 501 and presses the deposit start button 502. When detecting that the deposit start button 502 is pressed, the deposit operation is started by driving the feed-out unit and the receipt money carrying unit. The coins inputted into the coin receiving port drop down into the hopper and led so as to roll down onto the surface of the rotary disc. In the storing/feed-out unit 506, upon the start of the deposit operation, the rotary disc and the handover disc rotate, and the respective pick-up members protruding from the surface of the rotary disc pick up the coins one by one, and hand over the coins on the one-by-one basis onto the handover disc in a way that feeds the coins into the guide passage from the upper portion of the rotary disc. The coins received by the protrusions on the handover disc are fed one by one into the receipt money carrying passage of the receipt money carrying unit. In the receipt money carrying unit, upon the start of the deposit operation, the receipt money carrying belt is rotated. Then, the coins fed in on the one-by-one basis by the protrusions on the handover disc of the storing/feed-out unit 506 are received between the adjacent protrusions of the receipt money carrying belt 507 and carried through within the receipt money carrying passage toward the downstream side in the carrying direction while pushing the coins with the protrusions on the upstream side in the carrying direction. The coins carried through within the receipt money carrying passage come into contact with the alignment members at the inlet of the receipt money carrying passage. The alignment members align the coins so that the peripheral edges of the coins get contiguous to the guide portion on the lower side, thus getting the coins to pass through. The discriminating unit 509 discriminates between the coins getting contiguous to the guide portion on the lower side and thus carried in the aligned state.

As a result of the discrimination by the discriminating unit 509, if there are the coins unacceptable within the machine body, i.e., if there are the reject coins, the reject coin oriented allocation member positioned upstream most in the carrying direction allocates the reject coins from the receipt money carrying passage and returns these coins to a reject return port. The clerk at the cash register is notified of the returned coins by a display lamp provided at the front of the main body unit and by a sound of a buzzer, whereby the clerk at the cash register can take the coins out.

As the result of the discrimination by the discriminating unit 509, if the coins are normal enough to be acceptable within the machine body, these coins are carried to the positions of the allocation members 510 of the preset corresponding types. Then, the carried coins are allocated to the coin storing/discharging units 511 from the receipt money carrying passage. At this time, the apertures of the allocation members 510 positioned upstream of the allocation members 510 of the corresponding types are closed by the distributing members, with the result that the coins pass through the positions of the respective allocation members 510 located upstream.

The coins allocated by the type-by-type allocation members 510 drop down into the storage frames from the receipt coin storing ports of the coin storing/discharging units 511 of the corresponding denominations. These coins are accumulated on the storing/discharging belt or stacked on the already-stored coins. Then, if a detection signal is not output from an object detection sensor for detecting the coin etc on the rotary disc for a predetermined period of time and if the discriminating unit 509 does not discriminate between the coins for a predetermined period of time, it is judged that the processing of the coins inputted into the coin receiving port has been completed. Then, the feed-in unit and the receipt money carrying unit stop being driven, and the deposit operation is terminated.

(3) Payment Operation

The coin storing/discharging unit 511 stored with the coins of the corresponding type, which are to be paid, is driven based on a payment command signal transmitted from, e.g., the POS register. In the coin storing/discharging unit 511 of the corresponding type, the storing/discharging belt is rotated by the driving force of the motor, while the reverse roller is reversely rotated. Then, the coins in the non-aligned state on the storing/discharging belt are aligned in a single layer and in one row and thus discharged from the stored coin discharge port. At this time, the coins discharged from the stored coin discharge port of the coin storing/discharging unit pass through between the payment money carrying belt 512 of the payment money carrying unit and the payment passage wall of the upper face and are received onto the coin carrying surface of the payment money carrying belt 512. The payment coins on the coin carrying surface of the payment money carrying belt 512 are discharged into the coin discharge port by rotating the payment money carrying belt 512 with the driving force of the motor of the payment money carrying unit, thus paying out the coins to a catch tray.

At the stored coin discharge port in the coin storing/discharging unit 511, a discharge regulation member is retracted from the stored coin discharge port. A discharge coin count detecting unit detects the coins to be discharged, and, when reaching a payment count, the discharge regulation member enters the stored coin discharge port to forcibly stop the discharge of the coins. Simultaneously, the drive of the motor is stopped, thereby stopping the discharge operation.

Note that the payment money carrying belt 512 is rotated simultaneously with discharging the coins from the coin storing/discharging unit, whereby the coins sequentially discharged from the coin storing/discharging units may be carried in sequence and discharged into the coin discharge port, or alternatively all the coins equivalent to an amount of payment may be reserved on the payment money carrying belt 512 and thereafter discharged into the coin discharge port by carrying the coins batchwise.

The present coin change discharger 500 is capable of remarkably downsizing the apparatus as compared with the ordinary coin change dischargers because of inclining the storing/feed-out unit, the carrying path and the stored coin discharge unit.

(Another Example of Bill Change Discharger)

(1) Configuration

Figure 25:
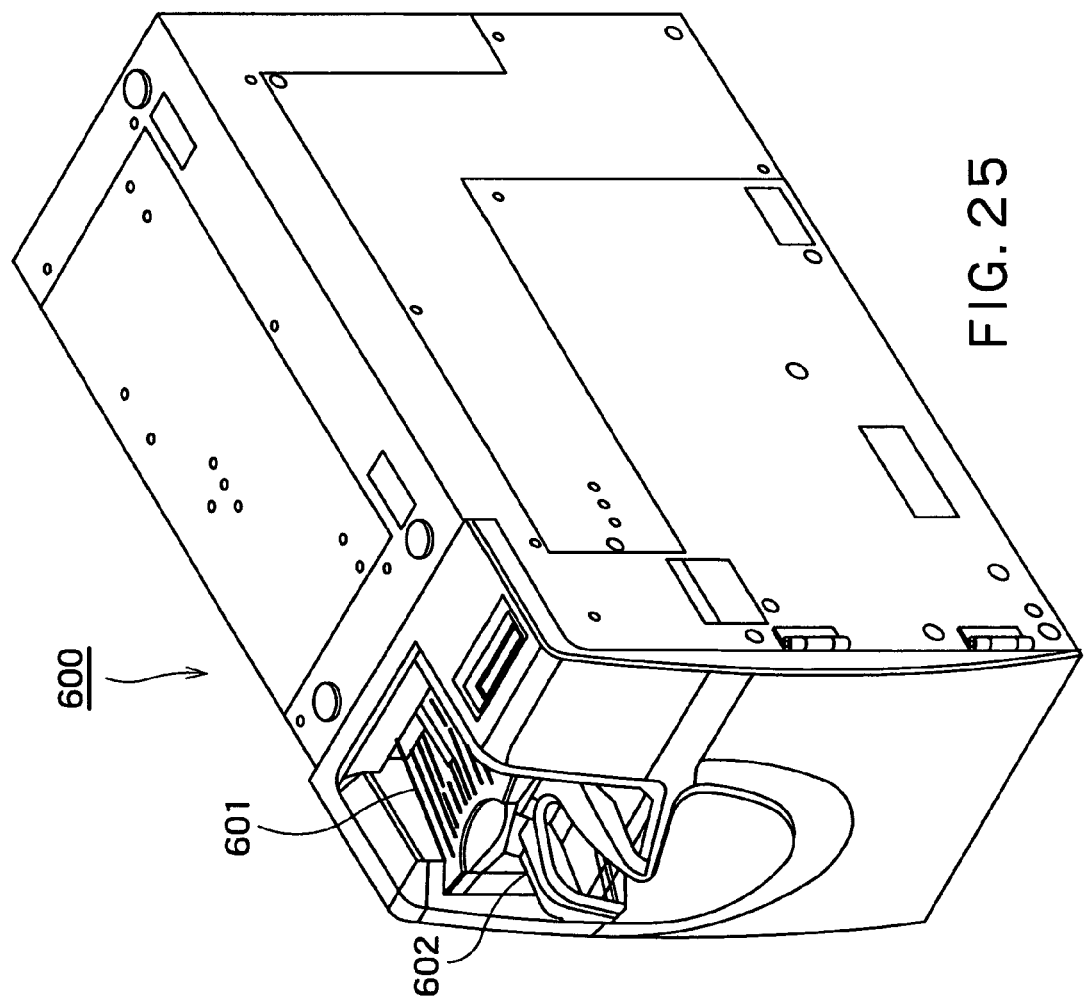
FIG. 25 is a perspective view illustrating an external appearance in yet another example of the coin change discharger.
Figure 26:
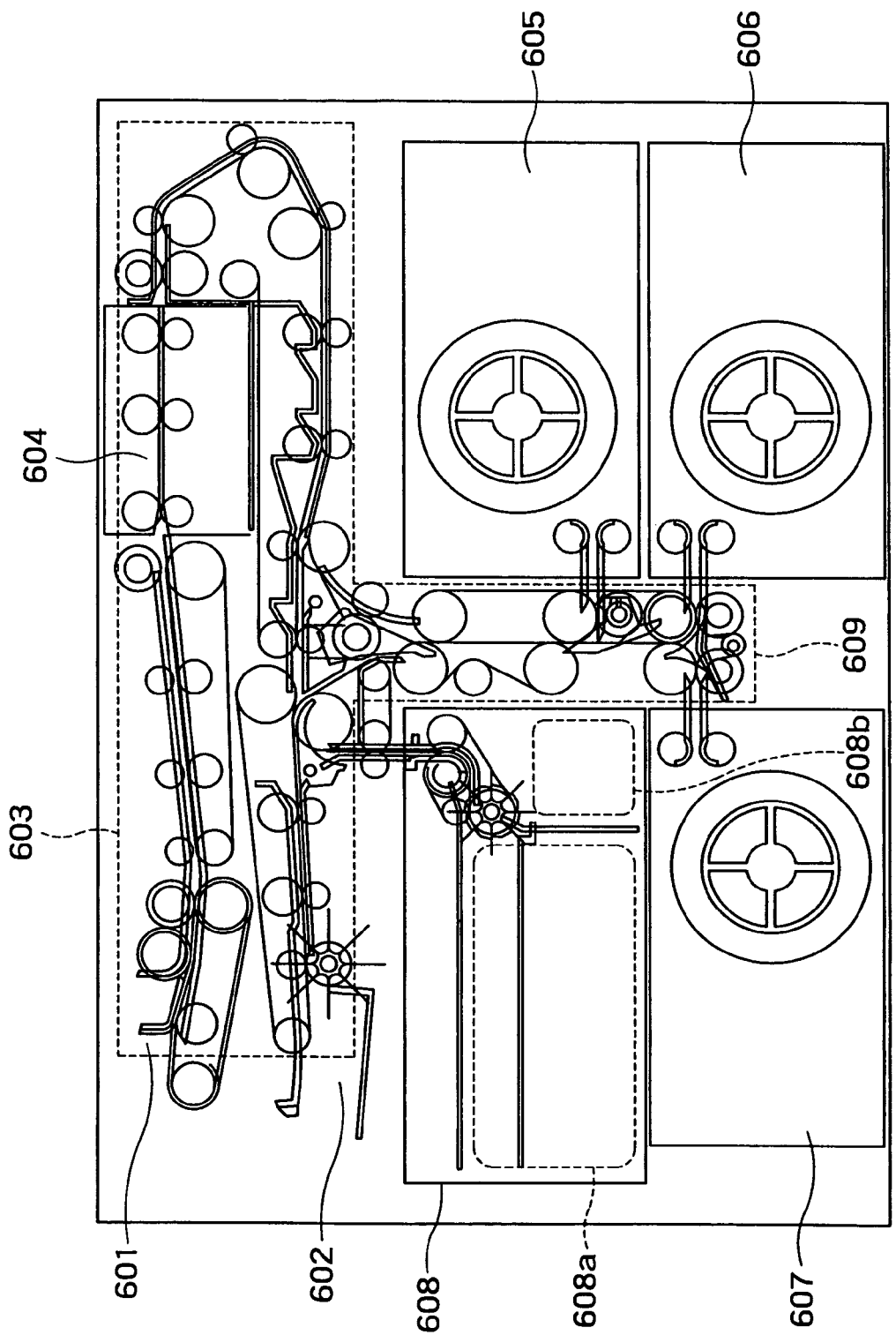
FIG. 26 is a sectional view illustrating an outline of the internal structure in yet another example of the coin change discharger.

FIG. 25 is a perspective view showing an external appearance of a coin change discharger 600. FIG. 26 is a schematic sectional view illustrating an internal structure thereof.

A deposit unit 601 for interesting and feeding out the bills is provided on the left side of the front upper face of the machine body of the bill change discharger 600. A pay-out unit 602 for paying out the payment bills is provided under the deposit unit 601. Furthermore, a display unit is provided on the right side of the front upper face.

Referring to FIG. 26, the bill change discharger 600 includes an upper carrying unit 603 for carrying the bills taken in from the deposit unit 601, a discriminating unit 604 provided substantially in the middle of the upper carrying unit 603, a first cassette 605, a second cassette 606, a third cassette 607 and a collecting cassette 608, which store and feed out the bills, and a lower carrying unit 609 for carrying the bills between the upper carrying unit 603 and these cassettes. Moreover, the collecting cassette 608 is partitioned by a collecting unit 608a and a general-purpose collecting unit 608b.

The deposit unit 601 is provided with an input unit capable of inputting the bills, the configuration being such that the bills set in the input unit when depositing the bills are fed out sheet by sheet to the upper carrying unit 603. The discriminating unit 604 is stored with discriminating information such as a size of the bill (vertical/lateral lengths of the bill, a thickness thereof, etc), a magnetic pattern, an optical pattern, etc on the denomination-by-denomination basis. The discriminating unit 604 discriminates between the denominations and between the authenticity and the falseness of the on-carry bills on the basis of the discriminating information and bill information acquired by a variety of sensors such as a photo sensor and a magnetic sensor within the discriminating unit.

The pay-out unit 602 is provided for paying out the bills sent from the lower carrying unit 609 when paying the money, or for returning the reject bills, which can not be discriminated by the discriminating unit 604, to the deposit unit.

The upper carrying unit 603 carries the bills inputted into the deposit unit 601 to the discriminating unit 604. The upper carrying unit 603 properly carries the bills judged to be the authentic bills via the lower carrying unit 609 to the first cassette 605, the second cassette 606, the third cassette 607 and the collecting unit 608a of the collecting cassette 608. The upper carrying unit 603 carries the bills judged to be the false bills to the general-purpose collecting unit 608b.

Furthermore, the upper carrying unit 603 is configured to carry, to the pay-out unit, the bills fed out from the lower carrying unit 609 when paying the money.

The lower carrying unit 609 receives the bills judged to be the authentic bills from the upper carrying unit 603 and carries the bills to the cassettes 606-607 corresponding to the denominations thereof or to the collecting unit 608a. Furthermore, the lower carrying unit 609 carries the bills fed out of the cassettes 605-607 and hands over the bills to the upper carrying unit 603. Moreover, in the case of receiving the bill judged to be the false bill from the upper carrying unit 603, the lower carrying unit 609 carries the false bill to the collecting unit 608a or the general-purpose collecting unit 608b, corresponding to the setting. Note that the collecting unit 608a collects the bills when disabled to carry the bills due to the full-state of each of the cassettes 605-607 or when emptying out the cassettes.

The first cassette 605, the second cassette 606 and the third cassette 607 are configured to store the bills according to the denominations or in the mixture state depending on the setting, and to enable the stored bills to be fed out. These cassettes 605-607 have all the same configuration, and hence the first cassette 605 will be explained.

The first cassette 605 includes two lengths of tapes, take-up rollers for winding up these tapes, a storage drum, an inlet/outlet roller, an idler and a sensor. An enclosure of the first cassette 605 is formed with a bill inlet/outlet via which the bills carried by the lower carrying unit 609 are inserted when stored. The two take-up rollers are previously wound with the two tapes each having a predetermined length. These take-up rollers feed out the two tapes between which the bills inserted from the bill inlet/outlet are pinched via the idler and the roller. The storage drum, simultaneously when the take-up rollers feed out the two tapes, wind up the two tapes and the bills in the state where the bills are pinched between the two tapes.

When taking out the bills from the cassette, the storage drum feeds out the two tapes and the bills in a direction opposite to the storing direction. The two tapes are thereby wound on the take-up rollers, and the bills are sent to the lower carrying unit from the inlet/outlet. Thus, in the first cassette, the bills are pinched between the two tapes, and the storage drum winds up the tapes, thus enabling the bills to be stored. Conversely, the two tapes are fed out of the storage drum, whereby the bills can be sent out. The cassette has the two sensors. Both of the sensors are constructed of photo sensors. The first sensor detects existence or non-existence of the bills wound with the tapes by the roller, and the second sensor detects the bills carried in the way of being pinched between the two tapes.

(2) Deposit Operation

Upon receiving a deposit instruction from the control terminal machine installed outside the bill change discharger 600, the deposit unit 601 feeds out the should-be-deposited bills sheet by sheet to the upper carrying unit 603. The discriminating unit 604 discriminates between the denominations and between the authenticity and the falseness of the on-carry bills. The bills discriminated as the authentic bills by the discriminating unit 604 are sent to the lower carrying unit 609 via the upper carrying unit 603. The authentic bills are carried to the cassettes 605-607 of the corresponding denominations thereof. At this time, when the bills are carried to the cassette of the corresponding denomination, it is determined whether this cassette gets full of the bills or not. If not full of the bills, the bills are carried to this cassette. Whereas if full of the bills, the bills are carried to the collecting unit 608a.

(3) Payment Operation

Upon receiving a payment instruction from the control terminal machine installed outside the bill change discharger 600, a designated number of bills of the applied denomination are fed out of the cassette stored with the bills of the denomination designated by the payment instruction among the cassettes 605-607. The lower carrying unit 609 and the upper carrying unit 603 carry the bills to the pay-out unit 602, and the user draws out the bills accumulated in the pay-out unit 602. The payment operation is thereby completed.

The bill change discharger 600 sets a pay-out sequence for feeding the bills from the cassettes stored with the bills on the denomination-by-denomination basis. The pay-out sequence is set as the sequence from the largest in length of the bill. The bill change discharger 600 can pay out the bills of the denominations designated by the payment instruction in the pay-out sequence, i.e., in the sequence from the largest in length of the bill. With this contrivance, when paid out, the bills are stacked in the bill-length sequence at the pay-out unit, whereby the person paying out the bills gets easy to see and easy to handle the bills. The bills may also be paid out in the sequence from the smallest in length of the bill, depending on the stacking sequence of the bills at the pay-out unit. Furthermore, when the cassettes are stored with the bills on the denomination-by-denomination basis, the pay-out sequence can be also set as the sequence according to the denominations, and the bills can be fed out in the denomination sequence. The denomination sequence is exemplified such as the sequence from the smallest or largest in amount. With this contrivance, the person paying out the bills becomes easy to handle the bills.

Moreover, when the cassettes are stored with the bills of a plurality of countries, on the occasion of the pay-out process, the bills may be paid out on a country-by-country (currency-by-currency) basis in the denomination sequence and may also be paid out on the country-by-country (currency-by-currency) basis in the bill-length sequence. With this contrivance, the person paying out the bills gets easy to see and easy to handle the bills. In this case, a preferable scheme is that at first, the bills are paid out preferentially on the country-by-country basis and Furthermore paid out according to the countries in the bill-length sequence or the denomination sequence.

The coin change discharger and the bill change discharger, which have been described so far, can be employed in the way of being replaced by the coin change dischargers and the bill change dischargers described in the embodiments, however, the bill and coin processing system according to the present invention can be build up by use of coin change dischargers and bill change dischargers other than those described above.

The embodiments discussed above are the exemplifications, and it is construed that the scope of the present invention embraces modifications and changes which are normally implemented by those skilled in the art according to the spirit of the present invention. Furthermore, the conceivable examples of the present invention will be given as below.

1. A bill and coin processing system comprising:
   a bill and coin processing apparatus; and
   a point-of-sales terminal machine,
   said bill and coin processing apparatus including:
   an interface unit capable of exchanging information via a communication unit with said point-of-sales terminal machine;
   a money receiving unit receiving money by way of a price of a commercial product;
   a discriminating unit discriminating between at least denominations of the bills and coins received from said money receiving unit;
   a storing/discharging unit stored with the received bills and coins on the basis of a result of the discrimination made by said discriminating unit and capable of discharging the bills and coins by giving a discharge instruction to said bill and coin processing apparatus from said point-of-sales terminal machine;
   a money discharging unit discharging the bills and coins outside a machine, which have been discharged from said storing/discharging unit; and a control unit controlling said money discharging unit to discharge the bills and coins from said storing/discharging unit on the basis of a discharge instruction accepted by said interface unit and given to bill and coin processing apparatus from said point-of-sales terminal machine.

2. A bill and coin processing system according to example 1, wherein said storing/discharging unit is constructed of a storing/discharging unit for bills and a storing/discharging unit for coins.

3. A bill and coin processing system according to example 2, wherein said storing/discharging unit for the bills and the storing/discharging unit for the coins are constructed of separate units housed in a single enclosure.

4. A bill and coin processing system according to example 2, wherein said storing/discharging unit for the bills and the storing/discharging unit for the coins are constructed of separate devices housed in respective independent enclosures.

5. A bill and coin processing system according to example 2, wherein each of said storing/discharging unit for the bills and the storing/discharging unit for the coins includes a plurality of storing/discharging units on a denomination-by-denomination basis.

6. A bill and coin processing system according to example 5, Furthermore comprising a setting unit that arbitrarily sets the denominations in said plurality of storing/discharging units.

7. A bill and coin processing system according to example 5, wherein said plurality of storing/discharging units undergo discharge-enabled and discharge-disabled settings according to the allocated denominations.

8. A bill and coin processing system according to example 7, wherein in said plurality of storing/discharging units, said storing/discharging unit allocated to the maximum-valued money in circulation undergoes the discharge-disabled setting.

9. A bill and coin processing system according to example 7, wherein said storing/discharging unit undergoing the discharge-disabled setting can be stored with the bills and coins of a plurality of denominations in mixture.

10. A bill and coin processing system according to example 7, wherein said bill and coin processing system simultaneously deals with the bills and coins of a plurality of countries, and can both store and discharge the bills and coins of one country but only stores the bills and coins of other countries, and in said plurality of storing/discharging units, said one-country-money-oriented storing/discharging unit of the denomination undergoing the discharge-disabled setting can be stored with the bills and coins of one country and the bills and coins of other countries in mixture.

11. A bill and coin processing system according to example 6, Furthermore comprising a setting changing means capable of setting the denominations in said plurality of storing/discharging units when starting a transaction even after said setting unit has arbitrarily set the denominations in said plurality of storing/discharging units.

12. A bill and coin processing system according to example 6, wherein said setting unit is a key input unit.

13. A bill and coin processing system according to example 12, wherein said key input unit is provided on any one of a panel surface provided on said point-of-sales terminal machine and a panel surface provided on said bill and coin processing apparatus.

14. A bill and coin processing system according to example 6, wherein said setting unit is an external device connected via a communication unit.

15. A bill and coin processing system according to example 1, wherein said control unit includes a receipt coin storability judging unit that judges in-machine storability of the received money on the basis of a result of the discrimination by said discriminating unit in accordance with the information inputted from said setting unit.

16. A bill and coin processing system according to example 15, wherein said receipt coin storability judging unit selects a type and the denomination of the received money, corresponding to a circulation quantity of the money.

17. A bill and coin processing system according to example 1, wherein said control unit includes a receipt money discharge validity judging unit that judges discharge validity of the received money on the basis of the result of the discrimination by said discriminating unit in accordance with the information inputted from said setting unit.

18. A bill and coin processing system according to example 17, wherein said receipt money discharge validity judging unit can judge the discharge validity on the basis of a currency series of the money.

19. A bill and coin processing system according to example 17, wherein said receipt money discharge validity judging unit judges the discharge validity of the bills on a denomination-by-denomination basis, and, when judging that the bills can be discharged, gets the coins disabled from being discharged together with restraining the discharge setting of the coins.

20. A bill and coin processing system according to example 1, wherein said discriminating unit discriminates between the bills and coins of the plurality of countries, and said storing/discharging units store and discharge the relevant bills and coins.

21. A bill and coin processing system according to example 20, wherein said setting unit, in the case of dealing with the bills and coins of the plurality of countries simultaneously, can set deposit-enabled and payment-enabled countries simultaneously.

22. A bill and coin processing system according to example 20, wherein said setting unit, in the case of dealing with the bills and coins of the plurality of countries simultaneously, can set deposit-enabled and payment-enabled countries individually.

23. A bill and coin processing system according to example 20, wherein said setting unit, in the case of dealing with the bills and coins of the plurality of countries simultaneously, can select payment of the bills and coins of one country and payment of bills and coins of other countries.

24. A bill and coin processing system according to example 20, wherein said setting unit, in the case of dealing with the bills and coins of the plurality of countries simultaneously, when receiving the bills and coins of one country and paying the bills and coins of other countries, or conversely when receiving the bills and coins of other countries and paying the bills and coins of one county, can set a rate conversion to be automatically conducted by said bill and coin processing apparatus and can set an amount of payment to be judged by said bill and coin processing apparatus.

25. A bill and coin processing system according to example 1, Furthermore comprising a money collecting unit that collects collection target moneys.

26. A bill and coin processing system according to example 25, wherein said control unit, if the money of the denomination undergoing the payment-disabled setting is received, stores this money directly in said money collecting unit without being stored in said storing/discharging unit.

27. A bill and coin processing system according to example 25, wherein said control unit restrains the payment-disabled setting about the minimum-valued denomination dealt with by said bill and coin processing apparatus or the minimum-valued denomination in circulation.

28. A bill and coin processing system according to example 1, wherein said control unit once rejects the maximum-valued money dealt with by said bill and coin processing apparatus or the maximum-valued denomination in circulation, and, only when receiving the money again, can get the maximum-valued money or the maximum-valued denomination stored.

29. A bill and coin processing system according to example 1, wherein said control unit, when paid from said coin storing/discharging unit and from said bill storing/discharging unit, controls the number of the payment bills and coins to be minimized.

30. A bill and coin processing system according to example 29, wherein said control unit, on the occasion of controlling the number of the payment bills and coins to be minimized, can get the payment money to be selected from any one of modes such as:
   (a) preferential discharge of any one of the coin and the bill;
   (b) discharge of any one of the coin and the bill;
   (c) discharge of only the coin;
   (d) discharge of only the bill; and
   (e) preferential discharge of one type of money having a larger amount of remainder.

31. A bill and coin processing system according to example 1, wherein said control unit compares on-hand bills and coins in said bill and coin processing apparatus with respect to a discharge denomination instruction and a discharge money count instruction based on a discharge command given from said point-of-sales terminal machine, and can, if disabled to pay the bills and coins, discharge the bills and coins in a way that changes some amount of bills and coins into another denomination to be equalized with the amount of bills and coins specified by the discharge command given from said point-of-sales terminal machine.

32. A bill and coin processing system according to example 1, wherein said control unit compares on-hand bills and coins in said bill and coin processing apparatus with respect to a discharge denomination instruction and a discharge money count instruction based on a discharge command given from said point-of-sales terminal machine, and can, if disabled to pay the bills and coins, discharge the bills and coins in a range of the bills and coins within said bill and coin processing apparatus.

33. A bill and coin processing system comprising:
   a bill and coin processing apparatus,
   said bill and coin processing apparatus including:
   an interface unit capable of exchanging information via a communication unit with a point-of-sales terminal machine;
   a money receiving unit receiving money by way of a price of a commercial product;
   a discriminating unit discriminating between at least denominations of the bills and coins received from said money receiving unit;
   a storing/discharging unit stored with the received bills and coins on the basis of a result of the discrimination made by said discriminating unit, capable of discharging the bills and coins by giving a discharge instruction to said bill and coin processing apparatus from said point-of-sales terminal machine, and stored with at least a couple of denominations at the same par-value, which are allocated to the bills and the coins;
   a money discharging unit discharging the bills and coins outside a machine, which have been discharged from said storing/discharging unit;
   a control unit controlling said money discharging unit to discharge the bills and coins from said storing/discharging unit on the basis of a discharge instruction accepted by said interface unit and given to said bill and coin processing apparatus from said point-of-sales terminal machine; and
   a same-par-value (i.e. common denomination) discharging unit discharging, when instructed to discharge the bills and coins at the applied par-value by said point-of-sales terminal machine, preferentially any one type of bills and coins, i.e., the coins or the bills at the same par-value on the basis of a previously-done setting.

34. A bill and coin processing system according to example 33, wherein said storing/discharging unit is constructed of a storing/discharging unit for bills and a storing/discharging unit for coins.

35. A bill and coin processing system according to example 34, wherein said storing/discharging unit for the bills and the storing/discharging unit for the coins are constructed of separate units housed in a single enclosure.

36. A bill and coin processing system according to example 34, wherein said storing/discharging unit for the bills and the storing/discharging unit for the coins are constructed of separate devices housed in respective independent enclosures.

37. A bill and coin processing system according to example 34, wherein each of said storing/discharging unit for the bills and the storing/discharging unit for the coins includes a plurality of storing/discharging units on a denomination-by-denomination basis.

38. A bill and coin processing system according to example 37, Furthermore comprising a setting unit that arbitrarily sets the denominations in said plurality of storing/discharging units.

39. A bill and coin processing system according to example 37, wherein said plurality of storing/discharging units undergo discharge-enabled and discharge-disabled settings according to the allocated denominations.

40. A bill and coin processing system according to example 39, wherein said bill and coin processing system simultaneously deals with the bills and coins of a plurality of countries, and can both store and discharge the bills and coins of one country but only stores the bills and coins of other countries, and
   in said plurality of storing/discharging units, said one-country-money-oriented storing/discharging unit of the denomination undergoing the discharge-disabled setting can be stored with the bills and coins of one country and the bills and coins of other countries in mixture.

41. A bill and coin processing system according to example 39, wherein in said plurality of storing/discharging units, said storing/discharging unit allocated to the maximum-valued money in circulation undergoes the discharge-disabled setting.

42. A bill and coin processing system according to example 39, wherein said storing/discharging unit undergoing the discharge-disabled setting can be stored with the bills and coins of a plurality of denominations in mixture.

43. A bill and coin processing system according to example 38, Furthermore comprising a setting changing means capable of setting the denominations in said plurality of storing/discharging units when starting a transaction even after said setting unit has arbitrarily set the denominations in said plurality of storing/discharging units.

44. A bill and coin processing system according to example 38, wherein said setting unit is a key input unit.

45. A bill and coin processing system according to example 44, wherein said key input unit is provided on any one of a panel surface provided on said point-of-sales terminal machine and a panel surface provided on said bill and coin processing apparatus.

46. A bill and coin processing system according to example 38, wherein said setting unit is an external device connected via a communication unit.

47. A bill and coin processing system according to example 33, wherein said control unit includes a receipt coin storability judging unit that judges in-machine storability of the received money on the basis of a result of the discrimination by said discriminating unit in accordance with the information inputted from said setting unit.

48. A bill and coin processing system according to example 47, wherein said receipt coin storability judging unit selects a type and the denomination of the received money, corresponding to a circulation quantity of the money.

49. A bill and coin processing system according to example 33, wherein said control unit includes a receipt money discharge validity judging unit that judges discharge validity of the received money on the basis of the result of the discrimination by said discriminating unit in accordance with the information inputted from said setting unit.

50. A bill and coin processing system according to example 38, wherein said control unit includes a same par-value discharge switching unit that compares, when discharging the bills and coins of the denominations at the same par-value on the basis of information given from said setting unit, a residual quantity of the bills and a residual quantity of the coins within the machine with an amount-of-discharge instruction given to said bill and coin processing apparatus from said point-of-sales terminal machine, and enables one type of bills and coins having a larger residual quantity to be discharged preferentially.

51. A bill and coin processing system according to example 38, wherein said control unit, when discharging the bills and coins of the denominations at the same par-value on the basis of information given from said setting unit, gets only the coins discharged.

52. A bill and coin processing system according to example 38, wherein said control unit, when discharging the bills and coins of the denominations at the same par-value on the basis of information given from said setting unit, gets only the bills discharged.

53. A bill and coin processing system according to example 38, wherein said control unit includes a same par-value discharge switching unit that, when discharging the bills and coins of the denominations at the same par-value on the basis of information given from said setting unit, enables one type of bills and coins having a larger amount of circulation to be discharged preferentially.

54. A bill and coin processing system according to example 50, wherein said same par-value discharge switching unit can, irrespective of the setting based on the information set by said setting unit, when starting a transaction, select any one of a plurality of arbitrary mode options such as:

(a) preferential discharge of any one of the coin and the bill;
(b) discharge of any one of the coin and the bill;
(c) discharge of only the coin;
(d) discharge of only the bill;
(e) preferential discharge of one type of money having a larger residual quantity; and
(f) preferential discharge of one type of money having a larger amount of circulation.

55. A bill and coin processing system according to example 49, wherein said receipt money discharge validity judging unit can judge the discharge validity on the basis of a currency series of the money.

56. A bill and coin processing system according to example 49, wherein said receipt money discharge validity judging unit judges the discharge validity of the bills on a denomination-by-denomination basis, and, when judging that the bills can be discharged, gets the coins disabled from being discharged together with restraining the discharge setting of the coins.

57. A bill and coin processing system according to example 33, wherein said discriminating unit discriminates between the bills and coins of the plurality of countries, and said storing/discharging units store and discharge the relevant bills and coins.

58. A bill and coin processing system according to example 57, wherein said setting unit, in the case of dealing with the bills and coins of the plurality of countries simultaneously, can set deposit-enabled and payment-enabled countries simultaneously.

59. A bill and coin processing system according to example 57, wherein said setting unit, in the case of dealing with the bills and coins of the plurality of countries simultaneously, can set deposit-enabled and payment-enabled countries individually.

60. A bill and coin processing system according to example 57, wherein said setting unit, in the case of dealing with the bills and coins of the plurality of countries simultaneously, can select payment of the bills and coins of one country and payment of bills and coins of other countries.

61. A bill and coin processing system according to example 57, wherein said setting unit, in the case of dealing with the bills and coins of the plurality of countries simultaneously, when receiving the bills and coins of one country and paying the bills and coins of other countries, or conversely when receiving the bills and coins of other countries and paying the bills and coins of one county, can set a rate conversion to be automatically conducted by said bill and coin processing apparatus and can set an amount of payment to be judged by said bill and coin processing apparatus.

62. A bill and coin processing system according to example 33, Furthermore comprising a money collecting unit that collects collection target moneys.

63. A bill and coin processing system according to example 62, wherein said control unit, if the money of the denomination undergoing the payment-disabled setting is received, stores this money directly in said money collecting unit without being stored in said storing/discharging unit.

64. A bill and coin processing system according to example 62, wherein said control unit restrains the payment-disabled setting about the minimum-valued denomination dealt with by said bill and coin processing apparatus or the minimum-valued denomination in circulation.

65. A bill and coin processing system according to example 33, wherein said control unit once rejects the maximum-valued denomination dealt with by said bill and coin processing apparatus or the maximum-valued denomination in circulation, and, only when receiving the money again, can get the maximum-valued money or the maximum-valued denomination stored.

66. A bill and coin processing system according to example 33, wherein said control unit, when paid from said coin storing/discharging unit and from said bill storing/discharging unit, controls the number of the payment bills and coins to be minimized.

67. A bill and coin processing system according to example 66, wherein said control unit, on the occasion of controlling the number of the payment bills and coins to be minimized, can get the payment money to be selected from any one of modes such as:
 (a) preferential discharge of any one of the coin and the bill;
 (b) discharge of any one of the coin and the bill;
 (c) discharge of only the coin;
 (d) discharge of only the bill; and
 (e) preferential discharge of one type of money having a larger amount of remainder.

68. A bill and coin processing system according to example 33, wherein said control unit compares on-hand bills and coins in said bill and coin processing apparatus with respect to a discharge denomination instruction and a discharge money count instruction based on a discharge command given from said point-of-sales terminal machine, and can, if disabled to pay the bills and coins, discharge the bills and coins in a way that changes some amount of bills and coins into another denomination to be equalized with the amount of bills and coins specified by the discharge command given from said point-of-sales terminal machine.

69. A bill and coin processing system according to example 33, wherein said control unit compares on-hand bills and coins in said bill and coin processing apparatus with respect to a discharge denomination instruction and a discharge money count instruction based on a discharge command given from said point-of-sales terminal machine, and can, if disabled to pay the bills and coins, discharge the bills and coins in a range of the bills and coins within said bill and coin processing apparatus.

70. A bill and coin processing system comprising:
 a bill and coin processing apparatus; and
 a point-of-sales terminal machine,
 said bill and coin processing apparatus including:
 an interface unit capable of exchanging information via a communication unit with said point-of-sales terminal machine;
 a money receiving unit receiving money by way of a price of a commercial product;
 a discriminating unit discriminating between at least denominations of the bills and coins received from said money receiving unit;
 a storing/discharging unit stored with the received bills and coins on the basis of a result of the discrimination made by said discriminating unit and capable of discharging the bills and coins by giving a discharge instruction to said bill and coin processing apparatus from said point-of-sales terminal machine;
 a money discharging unit discharging the bills and coins outside a machine, which have been discharged from said storing/discharging unit; and
 a control unit controlling said money discharging unit to discharge the bills and coins from said storing/discharging unit on the basis of a discharge instruction accepted by said interface unit and given to said bill and coin processing apparatus from said point-of-sales terminal machine,
 wherein said control unit sets, in said point-of-sales terminal machine, a mode of enabling said bill and coin processing apparatus to receive the bills and coins from a customer and a mode of permitting said bill and coin processing apparatus to receive the bills and coins for replenishment though said bill and coin processing apparatus is disabled to receive the bills and coins from the customer, and discriminates the received bills and coins from the bills and coins of the customer or the bills and coins of a shop.

71. A bill and coin processing system according to example 70, wherein said control unit, when setting in the point-of-sales terminal machine the mode of enabling the bill and coin processing apparatus to receive the bills and coins from the customer, establishes a deposit-enabled timing and a deposit-disabled timing on the basis of a specified event, and discriminates between the bills and coins received from the customer at the present and the bills and coins received from the customer anterior or posterior to the present customer.

72. A bill and coin processing system according to example 71, wherein the specified event is an operation related to a status of the present transaction.

73. A bill and coin processing system comprising:
 a bill and coin processing apparatus; and
 a point-of-sales terminal machine,
 said bill and coin processing apparatus including:
 an interface unit capable of exchanging information via a communication unit with said point-of-sales terminal machine;
 a money receiving unit receiving money by way of a price of a commercial product;
 a discriminating unit discriminating between at least denominations of the bills and coins received from said money receiving unit;
 a storing/discharging unit constructed of a storing/discharging unit for bills and a storing/discharging unit for coins, stored with the received bills and coins on the basis of a result of the discrimination made by said discriminating unit and capable of discharging the bills and coins by giving a discharge instruction to said bill and coin processing apparatus from said point-of-sales terminal machine;
 a money discharging unit discharging the bills and coins outside a machine, which have been discharged from said storing/discharging unit; and
 a control unit controlling said money discharging unit to discharge the bills and coins from said storing/discharging unit on the basis of a discharge instruction accepted by said interface unit and given to said bill and coin processing apparatus from said point-of-sales terminal machine, wherein said control unit accepts an input of selection about whether payment in cash is made or not, and, if the payment in cash is not selected, stops the operation of said storing/discharging unit for the coins.

74. A bill and coin processing system according to example 73, wherein said control unit Furthermore accepts an input of selection about whether the coins are inputted or not, and, if the coins are not inputted, stops the operation of said storing/discharging unit for the coins.

What is claimed is:

1. A bill and coin processing system comprising:
a bill and coin processing apparatus; and
a point-of-sales terminal machine,
said bill and coin processing apparatus including:
an interface unit to exchange information via a communication unit with said point-of-sales terminal machine;
a money receiving unit receiving money for a sold commercial product;
a discriminating unit discriminating at least one denomination of the money received through said money receiving unit;
a storing/discharging unit to store the money received based on a discrimination result made by said discriminating unit and to discharge the money according to a discharge instruction transmitted from said point-of-sales terminal machine to said bill and coin processing apparatus;
a money discharging unit discharging the money, which has been discharged by said storing/discharging unit, to the outside of the apparatus;
a setting unit that arbitrarily sets denominations in a plurality of said storing/discharging units; and
a control unit controlling said money discharging unit to discharge the money from said storing/discharging unit according to a discharge instruction, which is directed to said bill and coin processing apparatus from said point-of-sales terminal machine and is accepted by said interface unit,
wherein said control unit includes a money acceptance judging unit that judges whether or not the received money is to be stored in the apparatus on the basis of a discrimination result by said discriminating unit and in accordance with information input through said setting unit.

2. A bill and coin processing system according to claim 1, wherein said storing/discharging unit is constructed of a storing/discharging unit for bills and a storing/discharging unit for coins.

3. A bill and coin processing system according to claim 2, wherein said storing/discharging unit for the bills and the storing/discharging unit for the coins are constructed of separate units housed in a single enclosure.

4. A bill and coin processing system according to claim 2, wherein said storing/discharging unit for the bills and the storing/discharging unit for the coins are constructed of separate devices housed in respective independent enclosures.

5. A bill and coin processing system according to claim 2, wherein each of said storing/discharging unit for the bills and the storing/discharging unit for the coins includes a plurality of storing/discharging units on a denomination-by-denomination basis.

6. A bill and coin processing system according to claim 5, wherein said plurality of storing/discharging units undergo discharge-enabled and discharge-disabled settings according to the allocated denominations.

7. A bill and coin processing system according to claim 1, furthermore comprising a setting changing means that sets the denominations in said plurality of storing/discharging units when starting a transaction even after said setting unit has arbitrarily set the denominations in said plurality of storing/discharging units.

8. A bill and coin processing system according to claim 1, wherein said control unit includes a receipt money discharge validity judging unit that judges discharge validity of the received money on the basis of the result of the discrimination by said discriminating unit in accordance with the information inputted from said setting unit.

9. A bill and coin processing system according to claim 1, wherein said discriminating unit discriminates between the bills and coins of a plurality of countries, and
said storing/discharging units store and discharge the relevant bills and coins.

10. A bill and coin processing system according to claim 1, wherein said control unit once rejects the maximum-valued money dealt with by said bill and coin processing apparatus or the maximum-valued denomination in circulation, and, only when receiving the money again, can get the maximum-valued money or the maximum-valued denomination stored.

11. A bill and coin processing system according to claim 1, wherein said control unit, when paid from said coin storing/discharging unit and from said bill storing/discharging unit, controls the number of the payment bills and coins to be minimized.

12. A bill and coin processing system comprising:
a bill and coin processing apparatus,
said bill and coin processing apparatus including:
an interface unit to exchange information via a communication unit with a point-of-sales terminal machine;
a money receiving unit receiving money for a sold commercial product;
a discriminating unit discriminating at least one denomination of the money received through said money receiving unit;
storing/discharging units provided for each denomination, including at least a pair of them being respectively designated for a bill and a coin having a common denomination, said storing/discharging units to store the money received based on a discrimination result made by said discriminating unit and to discharge the money according to a discharge instruction transmitted from said point-of-sales terminal machine to said bill and coin processing apparatus;
a money discharging unit discharging the money, which has been discharged by said storing/discharging unit, to the outside of the apparatus;
a control unit controlling said money discharging unit to discharge the money from said storing/discharging unit according to a discharge instruction, which is directed to said bill and coin processing apparatus from said point-of-sales terminal machine and is accepted by said interface unit; and
a common denomination discharging unit, discharging when instructed to discharge by said point-of-sales terminal machine a common denomination, preferentially any one of a bill and a coin of said common denomination based on previously set information.

13. A bill and coin processing system according to claim 12, wherein said storing/discharging unit is constructed of a bill storing/discharging unit and a coin storing/discharging unit.

14. A bill and coin processing system according to claim 12, furthermore comprising a setting unit that arbitrarily sets the denominations in a plurality of said storing/discharging units.

15. A bill and coin processing system according to claim 12, wherein said control unit includes a switching unit that compares, when money of said common denomination is discharged, a quantity of bills and coins left in the apparatus with a discharge amount instruction transmitted from said point-of-sales terminal machine to said coin and bill processing apparatus, and selects to preferentially discharge any one of a bill and a coin left in a larger quantity.

16. A bill and coin processing system according to claim 12, wherein said control unit, when money of said common denomination is discharged, allows only a coin to be discharged.

17. A bill and coin processing system according to claim 12, wherein said control unit, when money of said common denomination is discharged, allows only a bill to be discharged.

18. A bill and coin processing system according to claim 12, wherein said control unit, when money of said common denomination is discharged, allows any one of a bill and a coin that circulate in a larger quantity to be discharged preferentially.

19. A bill and coin processing system according to claim 12, wherein a switching unit controls, when a transaction is started, to select a mode from a plurality of modes of:
 (a) preferential discharge of any one of a coin and a bill;
 (b) discharge of any one of a coin and a bill;
 (c) discharge of a coin only;
 (d) discharge of a bill only;
 (e) preferential discharge of a coin and a bill left in a larger quantity; and
 (f) preferential discharge of one of a coin and a bill that circulate in a larger quantity.

20. A bill and coin processing system comprising:
 a bill and coin processing apparatus; and
 a point-of-sales terminal machine,
 said bill and coin processing apparatus including:
 an interface unit to exchange information via a communication unit with said point-of-sales terminal machine;
 a money receiving unit receiving money for a sold commercial product;
 a discriminating unit discriminating at least one denomination of the money received through said money receiving unit;
 a storing/discharging unit to store the money received based on a discrimination result made by said discriminating unit and to discharge the money according to a discharge instruction transmitted from said point-of-sales terminal machine to said bill and coin processing apparatus;
 a money discharging unit discharging the money which has been discharged from said storing/discharging unit, to the outside of the apparatus; and
 a control unit for controlling said money discharging unit to discharge the money from said storing/discharging unit according to a discharge instruction, which is directed to said bill and coin processing apparatus from said point-of-sales terminal machine and is accepted by said interface unit,
 wherein said control unit sets, in said point-of-sales terminal machine, a first mode in which said bill and coin processing apparatus is allowed to receive money from a customer and a second mode, in which said bill and coin processing apparatus is not allowed to receive money from a customer but allowed to receive money for replenishment, whereby it is distinguished whether the received money is from a customer or a shop.

21. A bill and coin processing system according to claim 20, wherein said control unit, when setting in the point-of-sales terminal machine the mode of enabling the bill and coin processing apparatus to receive the bills and coins from the customer, establishes a deposit-enabled timing and a deposit-disabled timing on the basis of a specified event, and discriminates between the bills and coins received from the customer at the present and the bills and coins received from the customer anterior or posterior to the present customer.

22. A bill and coin processing system comprising:
 a bill and coin processing apparatus; and
 a point-of-sales terminal machine,
 said bill and coin processing apparatus including:
 an interface unit to exchange information via a communication unit with said point-of-sales terminal machine;
 a money receiving unit receiving money for a sold commercial product;
 a discriminating unit discriminating at least one denomination of the money received through said money receiving unit;
 a storing/discharging unit constructed of a bill storing/discharging unit and a coin storing/discharging unit, to store the money received based on a discrimination result made by said discriminating unit and to discharge the money according to a discharge instruction transmitted from said point-of-sales terminal machine to a bill and coin processing apparatus;
 a money discharging unit discharging the money, which has been discharged by said storing/discharging unit, to the outside of the apparatus; and
 a control unit for controlling said money discharging unit to discharge the money from said storing/discharging unit according to a discharge instruction, which is directed to said bill and coin processing apparatus from said point-of-sales terminal machine and is accepted by said interface unit,
 wherein said control unit accepts an input of selection about whether payment in cash is made or not, and, if the payment in cash is not selected, stops the operation of said storing/discharging unit.

* * * * *